United States Patent [19]
Dean et al.

[11] Patent Number: 5,867,763
[45] Date of Patent: Feb. 2, 1999

[54] METHOD AND APPARATUS FOR INTEGRATION OF A WIRELESS COMMUNICATION SYSTEM WITH A CABLE T.V. SYSTEM

[75] Inventors: Richard F. Dean; Lindsay A. Weaver, Jr., both of Boulder, Colo.; Charles E. Wheatley, III, Del Mar, Calif.

[73] Assignee: Qualcomm Incorporated, San Diego, Calif.

[21] Appl. No.: 600,104

[22] Filed: Feb. 8, 1996

[51] Int. Cl.⁶ .................................................. H04N 7/173
[52] U.S. Cl. ................................................. 455/5.1; 348/12
[58] Field of Search ................................ 455/3.1, 4.1, 4.2, 455/6.1, 5.1, 6.3, 561, 562, 524, 66, 436, 440, 444, 446, 447, 448, 449; 348/6, 7, 12, 13; H04N 7/16, 7/173

[56] References Cited

U.S. PATENT DOCUMENTS

| | | | |
|---|---|---|---|
| 4,901,307 | 2/1990 | Gilhousen et al. | 370/18 |
| 5,056,109 | 10/1991 | Gilhousen et al. | 379/59 |
| 5,101,501 | 3/1992 | Gilhousen et al. | 455/33 |
| 5,109,390 | 4/1992 | Gilhousen et al. | 375/1 |
| 5,265,119 | 11/1993 | Gilhousen et al. | 375/1 |
| 5,267,261 | 11/1993 | Blakeney, II et al. | 455/34.1 |
| 5,280,472 | 1/1994 | Gilhousen et al. | 370/18 |
| 5,309,474 | 5/1994 | Gilhousen et al. | 375/1 |
| 5,321,736 | 6/1994 | Beasley | 379/58 |
| 5,377,255 | 12/1994 | Beasley | 379/58 |
| 5,381,459 | 1/1995 | Lappington | 379/56 |
| 5,390,235 | 2/1995 | Beasley | 379/60 |
| 5,414,796 | 5/1995 | Jacobs et al. | 395/2.3 |
| 5,416,797 | 5/1995 | Gilhousen et al. | 375/705 |
| 5,475,870 | 12/1995 | Weaver, Jr. et al. | 455/67.1 |
| 5,644,622 | 7/1997 | Russell et al. | 455/422 |

FOREIGN PATENT DOCUMENTS

| | | | |
|---|---|---|---|
| 2296448 | 12/1990 | Japan . | |
| 2237706 | 5/1991 | United Kingdom . | |
| 9428690 | 12/1994 | WIPO . | |
| 9512296 | 5/1995 | WIPO | H04Q 7/38 |

OTHER PUBLICATIONS

"Wireless CATV Network Access For Personal Communications Using Simulcasting", Donaldson et al., IEEE Transactions, vol. 43 No. 3, Aug. 1994, pp. 666–671.

"The Advantage of Using Cable TV Distribution Plant for Linking PCS–Microcells", Beasley, IEEE Proceedings, Canada, Jun. 25–26, 1992, pp. 292–295.

*Primary Examiner*—Chris Grant
*Attorney, Agent, or Firm*—Russell B. Miller; Bruce W. Greenhaus

[57] ABSTRACT

The present invention is a method and apparatus for integrating a personal communication system with a cable television plant. A set of radio antenna devices (RAD) are connected to the cable plant. The RADs provide frequency conversion and power control of signal received from the cable plant for wireless transmission to the remote units. The RADs also provide power control and frequency conversion of wireless signals received from the remote units for transmission by the RADs onto the cable plant. In addition to the functions of standard base stations and centralized controller, the CATV base station must also compensate for gain variations in the cable plant. The downstream power control is regulated by a RAD reference signal which can be hidden within the CDMA signal for maximum efficiency. The upstream power control is regulated by an upstream gain reference signal which is individually transmitted by each RAD on the upstream link. The architecture of the present invention lends itself to a great deal of flexibility. Each RAD can operate as either an element of a distributed antenna or a base station sector unto itself. The function of each RAD as distributed antenna or as sector can be remotely programmed from the headend processor. Thus the capacity density of the system can be changed to accommodate the changing traffic density. The flexibility also is important at system deployment. When the system is deploy, the entire system may feed only one sector at the base station thus reducing the start-up cost of implementing a system. As system traffic increases, more resources can simply be added at the headend to provide more capacity.

1 Claim, 10 Drawing Sheets

METHOD AND APPARATUS FOR INTEGRATION OF A WIRELESS COMMUNICATION SYSTEM WITH A CABLE T.V. SYSTEM

BACKGROUND OF THE INVENTION

I. Field of the Invention

The present invention relates to communication systems, particularly to a method and apparatus for performing handoff between two sectors of a common base station.

II. Description of the Related Art

In a code division multiple access (CDMA) cellular telephone, wireless local loop or personal communications system, a common frequency band is used for communication with all base stations in a system. The common frequency band allows simultaneous communication between a remote unit and more than one base station. Signals occupying the common frequency band are discriminated at the receiving station through the spread spectrum CDMA waveform properties based on the use of a high speed pseudonoise (PN) code. The high speed PN code is used to modulate signals transmitted from both the base stations and the remote units. Transmitter stations using different PN codes or PN codes that are offset in time produce signals that can be separately received at the receiving station. The high speed PN modulation also allows the receiving station to receive several instances of a common signal from a single transmitting station where the signal has traveled over several distinct propagation paths due to the multipath characteristics of the radio channel or purposefully introduced diversity.

The multipath characteristics of the radio channel create multipath signals which travel several distinct propagation paths between the transmitting station and the receiving station. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than the other received pulses. Yet another characteristic of the multipath channel is that each path through the channel may cause a different phase on the signal. For example, if an ideal impulse is transmitted over a multipath channel, each pulse of the received stream of pulses generally has a different phase than the other received pulses.

In the radio channel, the multipath is created by reflection of the signal from obstacles in the environment, such as buildings, trees, cars, and people. In general the radio channel is a time varying multipath channel due to the relative motion of the structures that create the multipath. For example, if an ideal impulse is transmitted over the time varying multipath channel, the received stream of pulses would change in time, location, attenuation, and phase as a function of the time that the ideal impulse is transmitted.

The multipath characteristics of a channel can cause signal fading. Fading is the result of the phasing characteristics of the multipath channel. A fade occurs when multipath vectors act destructively, yielding a received signal that is smaller than either individual vector. For example if a sine wave is transmitted through a multipath channel having two paths where the first path has an attenuation factor of X dB (decibels), a time delay of $\delta$ with a phase shift of $\Theta$ radians, and the second path has an attenuation factor of X dB, a time delay of $\delta$ with a phase shift of $\Theta+\pi$ radians, no signal would be received at the output of the channel.

In narrow band modulation systems such as the analog FM modulation employed by conventional radio telephone systems, the existence of multiple path in the radio channel results in severe multipath fading. As noted above with a wideband CDMA, however, the different paths may be discriminated at the receiving station in the demodulation process. The discrimination of multipath signals not only greatly reduces the severity of multipath fading but provides an advantage to the CDMA system.

In an exemplary CDMA system, each base station transmits a pilot signal having a common PN spreading code that is offset in code phase from the pilot signal of other base stations. During system operation, the remote unit is provided with a list of code phase offsets corresponding to neighboring base stations surrounding the base station through which communication is established. The remote unit is equipped with a searching element that allows the remote unit to track the signal strength of the pilot signal from a group of base stations including the neighboring base stations.

A method and system for providing a communication with a remote unit through more than one base station during the handoff process are disclosed in U.S. Pat. No. 5,267,261, entitled "MOBILE ASSISTED SOFT HANDOFF IN A CDMA CELLULAR TELEPHONE SYSTEM," issued Nov. 30, 1993 assigned to the assignee of the present invention. Using this system, communication between the remote unit and the end user is uninterrupted by the eventual handoff from an original base station to a subsequent base station. This type of handoff may be considered as a "soft" handoff in that communication with the subsequent base station is established before communication with the original base station is terminated. When the remote unit is in communication with two base stations, the remote unit combines the signals received from each base station in the same manner that multipath signals from a common base station are combined.

In a typical macrocellular system, a system controller may be employed to create a single signal for the other end user from the signals received by each base station. Within each base station, signals received from a common remote unit may be combined before they are decoded and thus take full advantage of the multiple signals received. The decoded result from each base station is provided to the system controller. Once a signal has been decoded it cannot be 'combined' with other signals. Thus, the system controller must select between the plurality of decoded signals produced by each base station with which communication is established by a single remote unit. The most advantageous decoded signal is selected from among the base station and the other signals are simply discarded.

Remote unit assisted soft handoff operates based on the pilot signal strength of several sets of base stations as measured by the remote unit. The Active Set is the set of base stations through which active communication is established. The Neighbor Set is a set of base stations surrounding an active base station comprising base stations that have a high probability of having a signal strength of sufficient level to establish communication. The Candidate Set is a set of base stations having a pilot signal strength at a sufficient signal level to establish communication.

When communications are initially established, a remote unit communicates through a first base station and the Active Set contains only the first base station. The remote unit monitors the pilot signal strength of the base stations of the Active Set, the Candidate Set, and the Neighbor Set. When a pilot signal of a base station in the Neighbor Set exceeds a predetermined threshold level, the base station is added to the Candidate Set and removed from the Neighbor Set at the remote unit. The remote unit communicates a message to the first base station identifying the new base station. A cellular or personal communication system controller decides whether to establish communication between the new base station and the remote unit. Should the cellular or personal communication system controller decide to do so, the cellular or personal communication system controller sends a message to the new base station with identifying information about the remote unit and a command to establish communications therewith. A message is also transmitted to the remote unit through the first base station. The message identifies a new Active Set that includes the first and the new base stations. The remote unit searches for the new base station transmitted information signal and communication is established with the new base station without termination of communication through the first base station. This process can continue with additional base stations.

When the remote unit is communicating through multiple base stations, it continues to monitor the signal strength of the base stations of the Active Set, the Candidate Set, and the Neighbor Set. Should the signal strength corresponding to a base station of the Active Set drop below a predetermined threshold for a predetermined period of time, the remote unit generates and transmits a message to report the event. The cellular or personal communication system controller receives this message through at least one of the base stations with which the remote unit is communicating. The cellular or personal communication system controller may decide to terminate communications through the base station having a weak pilot signal strength.

The cellular or personal communication system controller upon deciding to terminate communications through a base station generates a message identifying a new Active Set of base stations. The new Active Set does not contain the base station through which communication is to be terminated. The base stations through which communication is established sends a message to the remote unit. The cellular or personal communication system controller also communicates information to the base station to terminate communications with the remote unit. The remote unit communications are thus routed only through base stations identified in the new Active Set.

Because the remote unit is communicating with the end user though at least one base station at all times throughout the soft handoff process, no interruption in communication occurs between the remote unit and the end user. A soft handoff provides significant benefits in its inherent "make before break" communication over conventional "break before make" techniques employed in other cellular communication systems.

In a cellular or personal communication telephone system, maximizing the capacity of the system in terms of the number of simultaneous telephone calls that can be handled is extremely important. System capacity in a spread spectrum system can be maximized if the transmission power of each remote unit is controlled such that each transmitted signal arrives at the base station receiver at the same level. In an actual system, each remote unit may transmit the minimum signal level that produces a signal-to-noise ratio that allows acceptable data recovery. If a signal transmitted by a remote unit arrives at the base station receiver at a power level that is too low, the bit-error-rate may be too high to permit high quality communications due to interference from the other remote units. On the other hand, if the remote unit transmitted signal is at a power level that is too high when received at the base station, communication with this particular remote unit is acceptable but this high power signal acts as interference to other remote units. This interference may adversely affect communications with other remote units.

Therefore, to maximize capacity in an exemplary CDMA spread spectrum system, the transmit power of each remote unit within the coverage area of a base station is controlled by the base station to produce the same nominal received signal power at the base station. In the ideal case, the total signal power received at the base station is equal to the nominal power received from each remote unit multiplied by the number of remote units transmitting within the coverage area of the base station plus the power received at the base station from remote units in the coverage area of neighboring base stations.

The path loss in the radio channel can be characterized by two separate phenomena: average path loss and fading. The forward link, from the base station to the remote unit, operates on a different frequency than the reverse link, from the remote unit to the base station. However because the forward link and reverse link frequencies are within the same general frequency band, a significant correlation between the average path loss of the two links exists. On the other hand, fading is an independent phenomenon for the forward link and reverse link and varies as a function of time.

In an exemplary CDMA system, each remote unit estimates the path loss of the forward link based on the total power at the input to the remote unit. The total power is the sum of the power from all base stations operating on the same frequency assignment as perceived by the remote unit. From the estimate of the average forward link path loss, the remote unit sets the transmit level of the reverse link signal. Should the reverse link channel for one remote unit suddenly improve compared to the forward link channel for the same remote unit due to independent fading of the two channels, the signal as received at the base station from this remote unit would increase in power. This increase in power causes additional interference to all signals sharing the same frequency assignment. Thus, a rapid response of the remote unit transmit power to the sudden improvement in the channel would improve system performance. Therefore, it is necessary to have the base station continually contribute to the power control mechanism of the remote unit.

Remote unit transmit power may also be controlled by one or more base stations. Each base station with which the remote unit is in communication measures the received signal strength from the remote unit. The measured signal strength is compared to a desired signal strength level for that particular remote unit. A power adjustment command is generated by each base station and sent to the remote unit on the forward link. In response to the base station power adjustment command, the remote unit increases or decreases the remote unit transmit power by a predetermined amount. By this method, a rapid response to a change in the channel is effected and the average system performance is improved. Note that in a typical cellular system, the base stations are not intimately connected and each base station in the system is unaware of the power level at which the other base stations receive the remote unit's signal.

When a remote unit is in communication with more than one base station, power adjustment commands are provided from each base station. The remote unit acts upon these multiple base station power adjustment commands to avoid transmit power levels that may adversely interfere with other remote unit communications and yet provide sufficient power to support communication from the remote unit to at least one of the base stations. This power control mechanism is accomplished by having the remote unit increase its transmit signal level only if every base station with which the remote unit is in communication requests an increase in power level. The remote unit decreases its transmit signal level if any base station with which the remote unit is in communication requests that the power be decreased. A system for base station and remote unit power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM," issued Oct. 8, 1991, assigned to the Assignee of the present invention.

Base station diversity at the remote unit is an important consideration in the soft handoff process. The power control method described above operates optimally when the remote unit communicates with each base station through which communication is possible. In doing so, the remote unit avoids inadvertently interfering with communications through a base station receiving the remote unit's signal at an excessive level but unable to communicate a power adjustment command to the remote unit because communication is not established therewith.

A typical cellular or personal communication system contains some base stations having multiple sectors. A multi-sectored base station comprises multiple independent transmit and receive antennas. The process of simultaneous communication with two sectors of the same base station is called softer handoff. The process of soft handoff and the process of softer handoff are the same from the remote unit's perspective. However, the base station operation in softer handoff is different from soft handoff. When a remote unit is communicating with two sectors of the same base station, the demodulated data signals of both sectors are available for combination within the base station before the signals are passed to the cellular or personal communication system controller. Because the two sectors of a common base station share circuitry and controlling functions, a variety of information is readily available to sectors of a common base station that is not available between independent base stations. Also two sectors of a common base station send the same power control information to a remote unit (as discussed below).

The combination process in softer handoff allows demodulated data from different sectors to be combined before decoding and thus produce a single soft decision output value. The combination process can be performed based on the relative signal level of each signal thus providing the most reliable combination process.

As noted above, the base station can receive multiple instances of the same remote unit signal. Each demodulated instance of the arriving signal is assigned to a demodulation element. The demodulated output of the demodulation element is combined. The combined signal is decoded. The demodulation elements, instead of being assigned to a single sector, may be assigned to a signal from any one of a set of sectors in the base station. Thus, the base station may use it resources with high efficiency by assigning demodulation elements to the strongest signals available.

Combining signals from sectors of a common base station also allows a sectorized base station to make a single power adjustment command for remote unit power control. Thus, the power adjustment command from each sector of a common base station is the same. This uniformity in power control allows flexible handoff operation in that sector diversity at the remote unit is not critical to the power control process. Further details of the softer handoff process are disclosed in U.S. patent application Ser. No. 08/144,903, filed Oct. 30, 1993, entitled "METHOD AND APPARATUS FOR PERFORMING HANDOFF BETWEEN SECTORS OF A COMMON BASE STATION," assigned to the assignee of the present invention. Further information on the benefits and application of softer handoff are disclosed in U.S. patent application Ser. No. 08/144,901, filed Oct. 30, 1993, entitled "METHOD AND APPARATUS FOR REDUCING THE AVERAGE TRANSMIT POWER FROM A SECTORIZED BASE STATION" and U.S. patent application Ser. No. 08/316,155, filed Sep. 30, 1994 entitled "METHOD AND APPARATUS FOR REDUCING THE AVERAGE TRANSMIT POWER OF A BASE STATION" each of which is assigned to the assignee of the present invention.

Each base station in the cellular system has a forward link coverage area and a reverse link coverage area. These coverage areas define the physical boundary beyond which base station communication with a remote unit is degraded. In other words, if a remote unit is within the base station's coverage area, the remote unit can communicate with the base station, but if the remote unit is beyond the coverage area, communications are compromised. A base station may have single or multiple sectors. Single sectored base stations have approximately a circular coverage area. Multi-sectored base stations have independent coverage areas that form lobes radiating from the base station.

Base station coverage areas have two handoff boundaries. A handoff boundary is defined as the physical location between two base stations where the link would perform the same regardless of whether the remote unit were communicating with the first or second base station. Each base station has a forward link handoff boundary and a reverse link handoff boundary. The forward link handoff boundary is defined as the location where the remote unit's receiver would perform the same regardless of which base station it was receiving. The reverse link handoff boundary is defined as the location of the remote unit where two base station receivers would perform the same with respect to that remote unit.

Ideally these boundaries should be balanced, meaning that they should have the same physical location. If they are not balanced, system capacity may be reduced as the power control process is disturbed or the handoff region unreasonably expands. Note that handoff boundary balance is a function of time, in that the reverse link coverage area shrinks as the number of remote units present therein increases. Reverse link power, which increases with each additional remote unit, is inversely proportional to the reverse link coverage area. An increase in receive power decreases the effective size of the reverse link coverage area of the base station and causes the reverse link handoff boundary to move inward toward the base station.

To obtain high performance in a CDMA or other cellular system, it is important to carefully and accurately control the transmit power level of the base stations and remote units in the system. Transmit power control limits the amount of self-interference produced by the system. Moreover, on the forward link, a precise level of transmit power can serve to balance the forward and reverse link handoff boundaries of a base station or a single sector of a multi-sectored base station. Such balancing helps to reduce the size of the handoff regions, increase overall system capacity, and improve remote unit performance in the handoff region.

Before adding a new base station to the existing network, the forward link (i.e. transmit) power and the reverse link (i.e. receive) signal power of the new base station are both approximately equal to zero. To begin the process of adding the new base station, an attenuator in the receive path of the new base station is set to a high attenuation level, creating a high level of artificial noise receive power. An attenuator in the transmit path is also set to a high attenuation level, which in turn causes a low transmit power level. The high level of artificial noise receive power results in the reverse link coverage area of the new base station being very small. Similarly, because the forward link coverage area is directly proportional to the transmit power, the very low transmit power level and the forward link coverage area is also very small.

The process then continues by adjusting the attenuators in the receive and transmit paths in unison. The attenuation level of the attenuator in the receive path is decreased, thereby decreasing the level of artificial noise receive power, increasing the natural signal level, and hence increasing the size of the reverse link coverage area. The attenuation level of the transmit path attenuator is also decreased, thereby increasing the transmit power level of the new base station and expanding its forward link coverage area. The rate at which the transmit power is increased and the artificial noise receive power is decreased must be sufficiently slow to permit handoff of calls between the new and surrounding base stations as the new base station is added to or removed from the system.

Each base station in the system is initially calibrated such that the sum of the unloaded receiver path noise and the desired pilot power is equal to some constant. The calibration constant is consistent throughout the system of base stations. As the system becomes loaded (i.e. remote units begin to communicate with the base stations), a compensation network maintains the constant relationship between the reverse link power received at the base station and the pilot power transmitted from the base station. The loading of a base station effectively moves the reverse link handoff boundary closer in toward the base station. Therefore, to imitate the same effect on the forward link, the pilot power is decreased as loading is increased. The process of balancing the forward link handoff boundary to the reverse link handoff boundary is referred to as base station breathing is detailed in U.S. Pat. No. 5,548,812 entitled "METHOD AND APPARATUS FOR BALANCING THE FORWARD LINK HANDOFF BOUNDARY TO THE REVERSE LINK HANDOFF BOUNDARY IN A CELLULAR COMMUNICATION SYSTEM" issued Aug. 20, 1996 and assigned to the assignee of the present invention. The process of balancing the forward link handoff boundary to the reverse link handoff boundary during the addition or removal of a base station from a system is referred to as base station blossoming and wilting is detailed in U.S. Pat. No. 5,475,870 entitled "APPARATUS AND METHOD FOR ADDING AND REMOVING A BASE STATION FROM A CELLULAR COMMUNICATION SYSTEM" issued Dec. 12, 1995 and assigned to the assignee of the present invention.

It is desirable to control the relative power used in each forward link signal transmitted by the base station in response to control information transmitted by each remote unit. The primary reason for providing such control is to accommodate the fact that in certain locations the forward link may be unusually disadvantaged. Unless the power being transmitted to the disadvantaged remote unit is increased, the signal quality may become unacceptable. An example of such a location is a point where the path loss to one or two neighboring base stations is nearly the same as the path loss to the base station communicating with the remote unit. In such a location, the total interference would be increased by three times over the interference seen by a remote unit at a point relatively close to its base station. In addition, the interference coming from the neighboring base stations does not fade in unison with the signal from the active base station as would be the case for interference coming from the active base station. A remote unit in such a situation may require 3 to 4 dB of additional signal power from the active base station to achieve adequate performance.

At other times, the remote unit may be located where the signal-to-interference ratio is unusually good. In such a case, the base station could transmit the corresponding forward link signal using a lower than nominal transmitter power, reducing interference to other signals being transmitted by the system.

To achieve the above objectives, a signal-to-interference measurement capability can be provided within the remote unit receiver. A signal-to-interference measurement is performed by comparing the power of the desired signal to the total interference and noise power. If the measured ratio is less than a predetermined value, the remote unit transmits a request to the base station for additional power on the forward link. If the ratio exceeds the predetermined value, the remote unit transmits a request for power reduction. One method by which the remote unit receiver can monitor signal-to-interference ratios is by monitoring the frame error rate (FER) of the resulting signal.

The base station receives the power adjustment requests from each remote unit and responds by adjusting the power allocated to the corresponding forward link signal by a predetermined amount. The adjustment would usually be small, typically on the order of 0.5 to 1.0 dB, or around 12%. The rate of change of power may be somewhat slower than that used for the reverse link, perhaps once per second. In the preferred embodiment, the dynamic range of the forward link adjustment is typically limited such as from 4 dB less than nominal to about 6 dB greater than nominal transmit power.

CDMA base stations have the ability to provide accurate control over their transmit power level. To provide accurate power control, it is necessary to compensate for variations in the gain in the various components comprising the transmit chain of the base station. Variations in the gain typically occur over temperature and aging such that a simple calibration procedure at deployment does not guarantee a precise level of output transmit power over time. Variations in the gain can be compensated by adjusting the overall gain in the transmit chain so that the actual transmit power of the base station matches a calculated desired transmit power. Each base station sector produces several signaling channels which operate at a variety of data rates and relative signal levels which combined create a raw radio frequency transmit signal. The channel element modulators, each of which corresponds to a channel, calculate the expected power of each channel signal. The base station also comprises a base station transceiver system controller (BTSC) which generates a desired output power of the sector by summing the expected powers of each channel.

A key aspect in implementing a wireless communication system is placement of antennas throughout the coverage area such that every location in the entire coverage area where a remote unit may be located is supported with sufficient signal levels. To create a distributed antenna, the transmit output of the base station is fed to a string of antenna elements each separated by delay. A distributed antenna exploits the ability of direct sequence CDMA to discriminate against multipath by creation of deliberate multipath that satisfies discrimination criteria.

A technique for improving performance of a distributed antenna system using parallel strings of discrete antennas wherein each antenna on a common string is separated from its neighbors by delay is disclosed in U.S. Pat. No. 5,280,472 entitled "CDMA MICROCELLULAR TELEPHONE SYSTEM AND DISTRIBUTED ANTENNA SYSTEM THEREFOR", which issued on Jan. 18, 1994 and assigned to the assignee of the present invention. Further development of the distributed antenna concept is disclosed in U.S. Pat. No. 5,513,176, issued on Apr. 30, 1996, entitled "DUAL DISTRIBUTED ANTENNA SYSTEM", and assigned to the assignee of the present invention. In the distributed antenna arrangement, signals transmitted from antennas of different antenna elements at a common node are provided different delay paths between the base station and the antenna. The antenna elements may comprise downconversion circuitry thus reducing the cabling path loss between the antenna elements and the base station and allowing the use of readily available SAW devices as delay elements.

Another advantage of the distributed antenna arrangement is that little site specific engineering is required for installation. Normally, antenna placement is determined only by physical constraints, together with the requirement that every location desiring service must be covered by a set of two antennas. There is no concern for the overlapping of antenna patterns. In fact, overlapping coverage is desirable in that it provides diversity operation to all terminals in the overlap area. Overlap is, however, not required.

An objective of a personal mobile communications network is to provide coverage over a large geographic region. Such broad geographic coverage is essential and must be provided on the first day of service to attract users in the present economic environment. One of the major expenses of providing coverage over a large geographic area is the acquisition of real estate and land usage rights and the installation of base stations each providing coverage for a portion of the total geographic coverage area.

Note that cable television (CATV) networks provide extensive coverage over nearly all suburban areas. Thus, if the CATV network, called the cable plant, could be used as the basis for a wireless communication network, the task of obtaining real estate and land usage rights and the expense of installing discrete base stations could be avoided. Thus, a centralized headend processor could provide the necessary signal processing functions at a single location within the geographic region and the cable distribution means could be used to carry the wireless signal to the users.

The characteristics of the CDMA system provide a myriad of advantages in a CATV based wireless system. The integration of the wireless communication network with the cable plant can be carefully orchestrated to take full benefit of the flexibility and capacity of the CDMA system. The present invention seeks to define such a system.

SUMMARY OF THE INVENTION

The present invention is a method and apparatus for integrating a personal communication system with a cable television plant. A set of radio antenna devices (RADs) are connected to the cable plant. The RADs provide frequency conversion and power control of the signal received from the cable plant for wireless transmission to the remote units. The RADs also provide power control and frequency conversion of wireless signals received from the remote units for transmission by the RADs onto the cable plant.

At the headend of the cable plant, a base station is installed to act as an interface between the RADs and the public switch telephone network (PSTN). The base station provides the functions of a standard macrocellular base station such as frequency downconversion, demodulation, signal combination, and signal decoding as well as modulation, power control and frequency upconversion. The base station may also perform some of the functions which are usually performed by a centralized system controller in a standard macrocellular system such as selection vocoding functions.

In addition to the functions of standard base stations and centralized system controller, the CATV base station must also compensate for gain variations in the cable plant. The downstream power control is regulated by a RAD reference signal which can be hidden within the CDMA signal for maximum efficiency. The upstream power control is regulated by an upstream gain reference signal which is individually transmitted by each RAD on the upstream link.

The architecture of the present invention lends itself to a great deal of flexibility. Each RAD can operate as either an element of a distributed antenna or a base station sector unto itself. The function of each RAD as distributed antenna or as sector can be remotely programmed from the headend processor. Thus, the capacity density of the system can be geographically changed to accommodate the changing traffic density.

The flexibility also is important at system deployment. When the system is deployed, the entire system may need only one sector at the base station to service the initially low volume of users. As system use increases, more resources can simply be added at the headend to provide more capacity. The RADs are reprogrammed remotely from the headend to operate with the newly added resources.

The intimate relation of the base station resources allows the system to combine signals arriving corresponding to different sectors throughout the system after demodulation and before decoding. Thus, softer handoff may be performed over the entirety of the service area.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 11 shows a scenario in which the RAD reference signal is placed in the center of the CDMA sector signal.

DETAILED DESCRIPTION OF THE PREFERRED EMBODIMENTS

Figure 1:
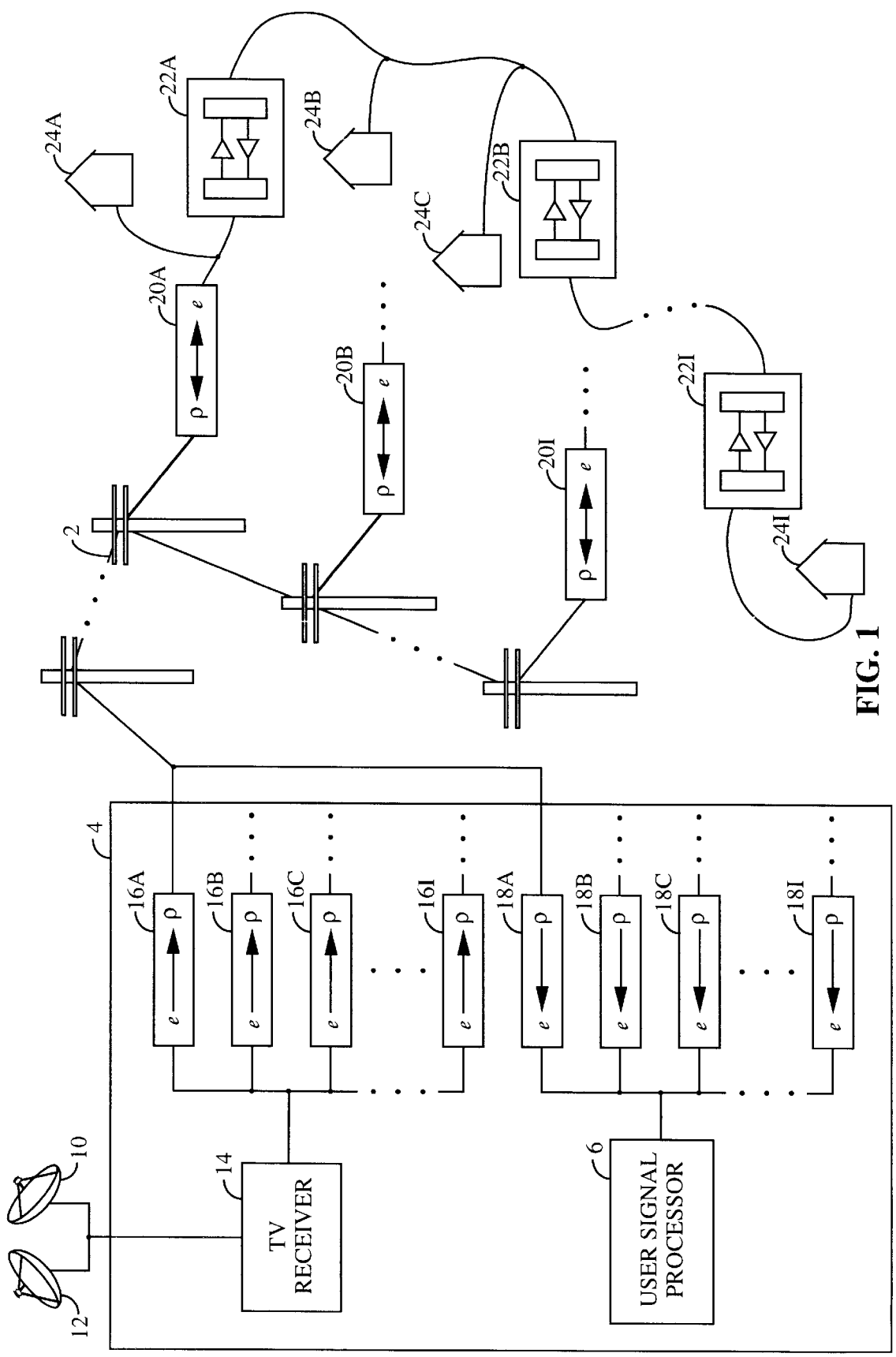
FIG. 1 is a diagram illustrating an exemplary cable plant.

FIG. 1 shows an exemplary cable plant. Satellite signal antennas 10 and 12 receive television (T.V.) signals typically in the Ku or C band frequency range at headend 4. T.V. receiver 14 within headend 4 converts the signals to the lower RF frequencies for transmission throughout the cable plant. Typically, downstream T.V. signals are carried within the frequency range of 54 MegaHertz (MHz) to 550 MHz. The electrical RF signals output from T.V. receiver 14 are passed to a bank of electrical to optical signal converters 16A–16I. Each of electrical to optical signal converters 16A–16I converts the electrical RF signals to optical signals for fiber optic transmission to a subset of the geographical coverage areas serviced by a plurality of fiber nodes 20A–20I. For example, fiber 2 carries the optical signals from electrical to optical signal converter 16A to fiber node 20A. Fiber nodes 20A–20I are spaced throughout the geographic area serviced by the signal from fiber 2. Each of fiber nodes 20A–20I provides the signal through electrical signal cable to a plurality of destinations 24A–24I, such as houses, apartment buildings, and businesses. Located along the length the electrical signal cable are a plurality of bi-directional amplifiers 22A–22I. The electric signal cable and amplifiers may also be arranged in a parallel and/or star configuration rather than the series configuration shown in FIG. 1.

The path of the T.V. signal from headend 4 to destinations 24A–24I is referred to as the downstream path. Typically, a city with a population of about 1 million people has three or four headends. The fiber lines, such as fiber 2, run long distances in underground conduits or above ground poles. From each fiber node 20A–20I, the electric signal cables usually run about a mile or less depending on the number of destination. Bi-directional amplifiers 22A–22I may be inserted every 1000 feet along the electrical signal cable. Typically, no more than five bi-directional amplifiers are cascaded along any one electrical signal cable due to the intermodulation distortion added by each amplifier.

The Federal Communication Commission (FCC) regulations require that the cable plant provide bi-directional communication with the destinations. As such, in addition to the downstream system providing T.V. signals to the destination, an upstream system provides a signaling path from destinations 24A–24I back to headend 4. The upstream path is intended to carry a much lower volume of signaling traffic than the downstream path. The upstream path may be used, for example, to indicate the selection of a "pay-per-view" option by a user.

The upstream link operates essentially the same as the reverse of the downstream link. Typically, the upstream link operates on a more limited frequency range such as from 5–40 MHz. Signals from destinations 24A–24I are carried via the electrical signal cable and bi-directional amplifiers 22A–22I to fiber node 20A. At fiber nodes 20A–20I, the signals are converted from the electrical form to optical form for transmission on fiber 2. At headend 4, the upstream signals are converted to electrical form by optical to electrical signal converters 18A–18I. The upstream signal are then processed by user signal processor 6.

In typical configurations, there is a one to one mapping between electrical to optical signal converters 16A–16I and fiber nodes 20A–20I. A unique fiber within fiber 2 carries each downstream and upstream signal separately.

Figure 2:
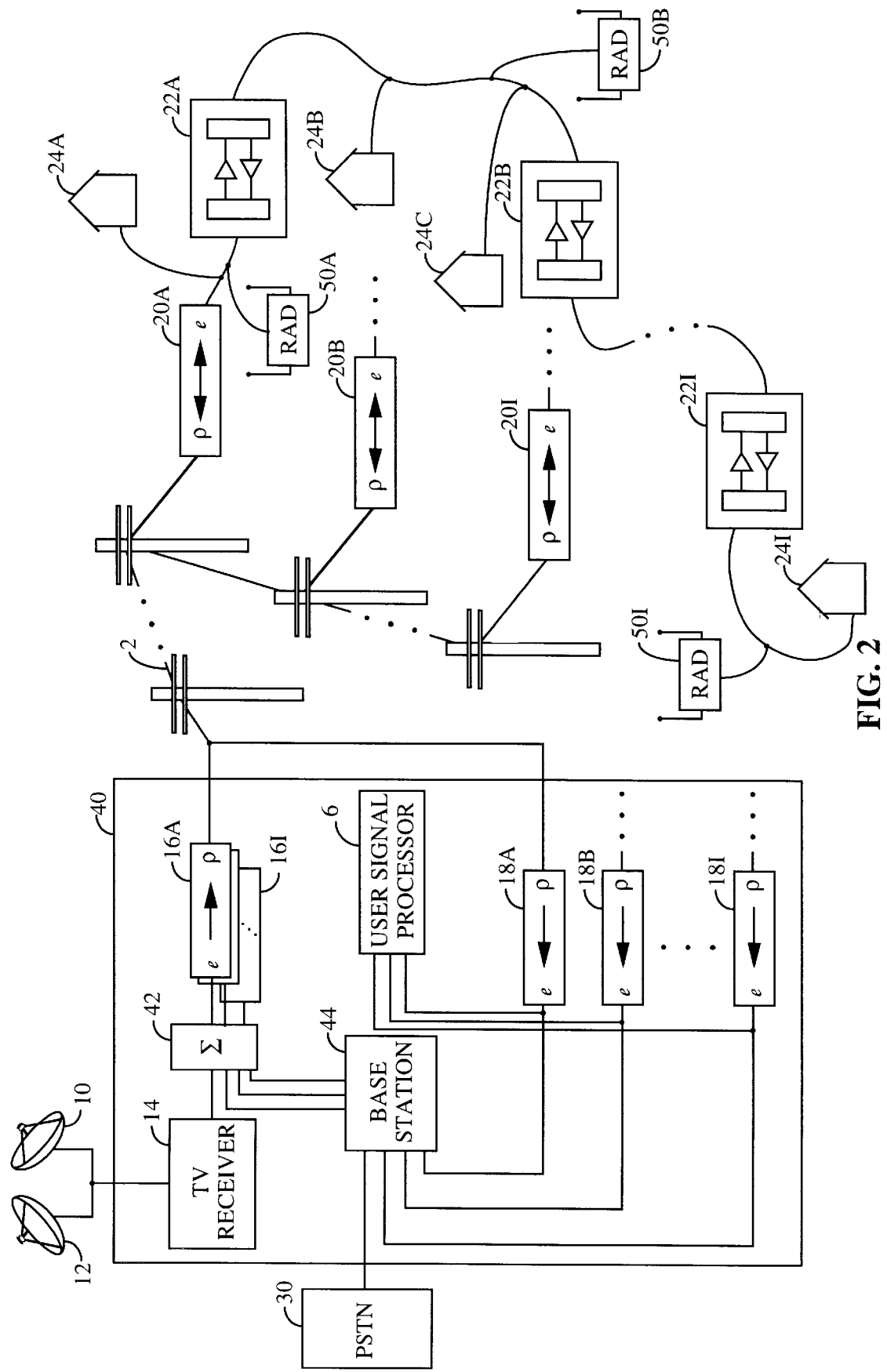
FIG. 2 is a block diagram illustrating an exemplary cable plant integrated with a personal communication system.

FIG. 2 shows an exemplary architecture embodying the present invention integrated with the exemplary cable plant of FIG. 1. Headend 4 has been replaced with headend 40 which provides the wireless communication functionality. Within headend 40 is base station 44 which interfaces the wireless communication network with public switched telephone network (PSTN) 30. In addition base station 44 provides for the generation of the forward link code division multiple access (CDMA) call signals as well as pilot and other overhead signals which are distributed on the downstream link. Base station 44 also provides for the selection or combination of the reverse link CDMA call signal and overhead signals as received on the upstream link. Base station 44 is explained in greater detail subsequently herein.

As noted above, the downstream CATV plant typically carries T.V. signals in a frequency band of 54 MHz–550 MHz. However, the downstream CATV plant is capable of providing communication of signals up to 700 MHz. Some very new systems are capable of operation up to 850 MHz. In those older systems that run only to 350 to 450 MHz, several T.V. may need to be cleared for use in the PCS. In the preferred embodiment of the present invention, the CDMA forward links signals are carried in the 550 MHz–700 MHz frequency range. Each sector of the CDMA forward link is allocated a portion of the available frequency band within the CATV plant. The forward link output from base station 44 is summed with the T.V. signals from T.V. receiver 14 by summer 42. The forward link CDMA signals are transmitted in essentially the same manner as the T.V. signals through the downstream CATV link. As explained in great detail subsequently herein, the destination of some of the forward link CDMA signals are the radio antenna devices (RAD) 50A–50I. RADs 50A–50I radiate the forward link CDMA signal into the geographic service area associated with fiber node 20A. RADs 50A–50I are spaced along the length of electrical cable associated with fiber node 20A typically with a spacing of 1000–1500 feet. The forward link CDMA signals are passed through bi-directional amplifiers 22A–22I with the T.V. signals. RADs 50A–50I, obviously, must be placed such that the signals they provide may be radiated with sufficient energy levels over the desired coverage area. As such, if the electrical cable associated with fiber node 20A is underground, RADs 50A–50I may be installed at one or more of destinations 24A–24I. For example, even if the electrical cable is underground, the cable emerges from the ground to connect to the physical structure associated with each destination. RADs 50A–50I may be installed on the roof top of a residence. If the electrical cable associated with fiber node 20 is above ground, RADs 50A–50I may be placed anywhere along the cable itself or with one of the poles supporting the electrical cable. As noted above the upstream link operates over the frequency range of 5–40 MHz. The reverse link CDMA system operates most advantageously if there is diversity in the receive path such that each of RADs 50A–50I has two different receive antennas each providing a separate signal back to base station 44. Thus, if the reverse link CDMA signals were to be frequency multiplexed within the CATV plant, twice as much spectrum bandwidth would be required on the reverse link than that used for the forward link CDMA signals. But only 35 MHz of bandwidth is available on the upstream CATV plant. Thus, as shown in FIG. 2, each fiber node 20A–20I corresponds to a direct path to a corresponding one of optical to electrical signal converters 18A–18I. Each of optical to electrical signal converters 18A–18I is connected to headend processor 40. Base station 44 outputs and receives signal to and from PSTN 30.

As noted above, one important aspect of a CDMA communication system is the power control of both the forward and reverse link. In prior art CDMA base stations, the signal generation means and the antenna means are collocated. Thus, the prior CDMA base stations may simply set the transmit power level directly. Likewise, the prior art CDMA base stations may directly measure the signal levels of the signals it receives.

In contrast, in the CATV plant based system, base station 44 and RADs 50A–50I can be located many miles apart. Also, a quick glance at FIG. 2 shows that the path between each individual RAD 50A–50I to base station 44 is different. In addition to the fixed physical differences between the paths, the gain of the CATV plant varies considerably over time such as in response to the wide range of temperatures over which the system must work. The CATV plant also is subjected to a variety of dynamic ingress signals. Ingress signals are unwanted signals which enter the cable plant. A multitude of ingress signals are created in the urban environment such as from other communications system (such as local T.V. systems, commercial broadcast radio systems, Citizen Band Radios) and from machinery which creates random sporadic emissions (such as emissions from starting an automobile). The ingress signals are highly unpredictable and highly variable over time.

Given the importance of power control to the CDMA system and the complexity and variability of the amplitude response of the cable plant, power control becomes an important aspect of the present invention. The forward link power control compensation is accomplished by use of a RAD reference signal transmitted over the downstream link. The reverse link power control compensation is accomplished by use of an upstream gain reference signal transmitted over the upstream link. The form and function of the RAD reference signal and upstream gain reference signal are explained explicitly below.

Figure 3:
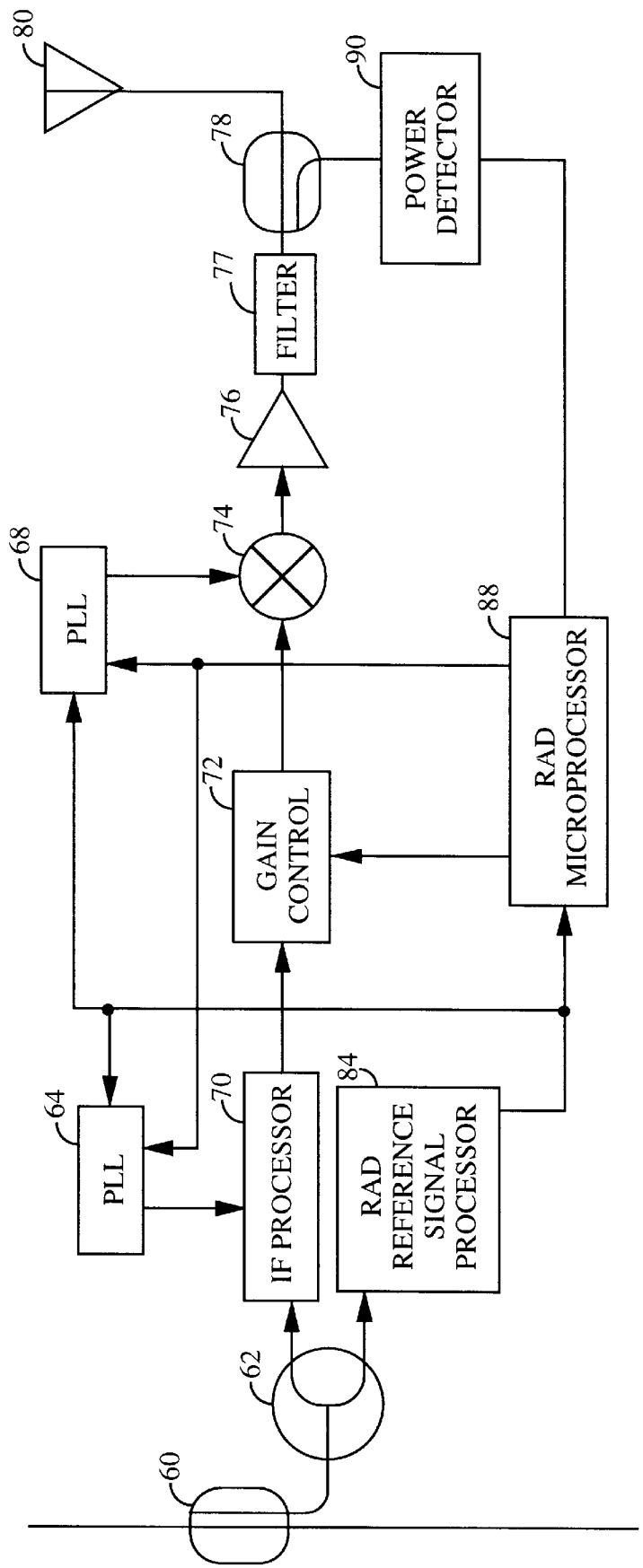
FIG. 3 shows the forward link signal processing structure of an exemplary radio antenna device (RAD)

Before explaining the power control compensation mechanism, first let us examine the structure of the RADs themselves. Each RAD provides both forward link and reverse link signal processing. FIG. 3 shows the forward link signal processing structure of an exemplary RAD incorporating the preferred embodiment thereof. In FIG. 3, coupler 60 couples the RF signal from the electrical cable. Splitter 62 divides the incoming signal so that it can be used by two different processing elements. RAD reference signal processor 84 extracts the RAD reference signal from the variety of signals present on the electrical cable. The RAD reference signal has three purposes: to act as a channel gain reference, to act as a reference for the frequency synthesizers, and to transmit control data to the RAD. Each of these functions is detailed below. RAD reference signal processor 84 extracts the frequency reference signal from the RAD reference signal and provides it to phase lock loops (PLL) 64 and 68. RAD reference signal processor 84 also extracts the gain reference signal which is further processed by RAD microprocessor 88 and eventually provided to gain control 72. RAD reference signal processor 84 further extracts any control data and provides it to RAD microprocessor 88 for further analysis. The control data may comprise commands from headend 40 intended solely for this RAD. For example, the control data may indicate that the frequency of PLL 68 or PLL 64 should be changed to a new frequency.

Intermediate frequency (IF) processor 70 also receives a signal from splitter 62. IF processor 70 frequency converts the incoming signal such that the desired signal is centered about a predetermined IF frequency. As noted above, the forward link CDMA signals are frequency multiplexed in the cable plant. The frequency generated by PLL 64 is mixed with the incoming signal from splitter 62 such that the desired waveform is centered about the predetermined IF frequency. Typically a IF processor 70 uses a surface acoustic wave (SAW) filter or other filter matched to the wave shape of the signal which the RAD is transmitting and rejecting the other signals coming from splitter 62. If the physical distance between the RADs is insufficient to provide delay to create usable multipath delays, IF processor 70 may also comprise a field replaceable or programmable or fixed delay element.

The IF frequency signal is output from IF processor 70 to gain control 72. Gain control 72 sets the transmit output power of the RAD in response to a control signal from RAD microprocessor 88. Mixer 74 upconverts the gain controlled signal output from gain control 72 to the transmission frequency. Power amplifier 76 provides a nominally fixed gain and amplifies the signal to an appropriate power for transmission. Filter 77 filters the signal for transmission to suppress any unwanted mixer products. Coupler 78 couples a small amount of the power transmitted from this RAD over antenna 80. The coupled power from coupler 78 is measured by power detector 90 and the result is reported back to RAD microprocessor 88.

Figure 4:
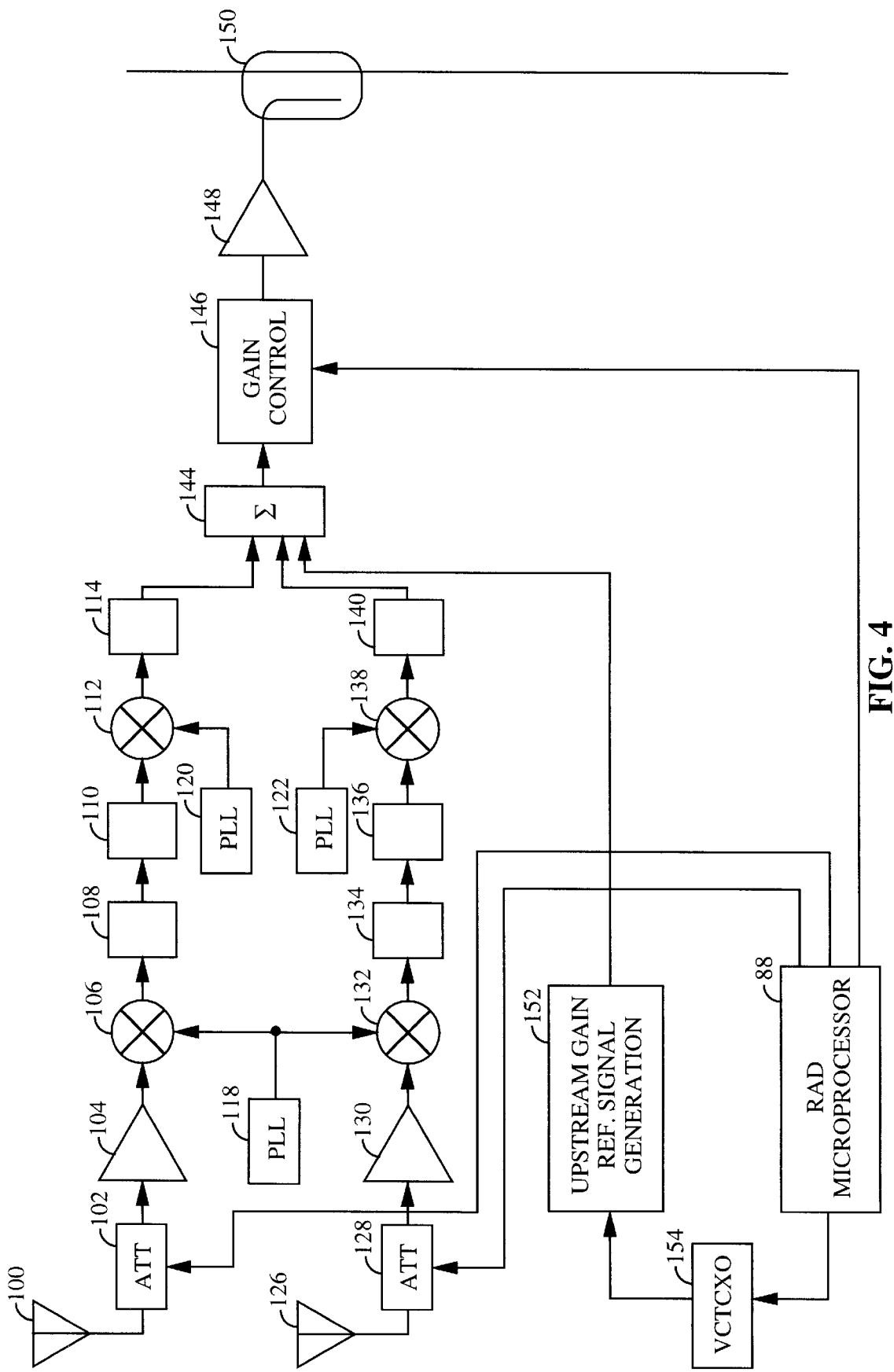
FIG. 4 shows the reverse link signal processing structure of an exemplary RAD.

FIG. 4 shows the reverse link signal processing structure of an exemplary RAD incorporating the preferred embodiment thereof. In FIG. 4, antennas 100 and 126 are each associated with this RAD. Using two collocated antennas placed some distance apart at each RAD introduces desirable diversity. The separation between the antennas should allow the two antennas to have substantially the same coverage area while providing independent fading. Placing two antennas at one base station to obtain diversity is common practice in macrocellular systems. In a macrocellular system, two antennas having relatively large coverage areas, generally on the order of several miles, are placed at one base station. Typically, the antennas are placed about 5 to 20 wavelengths apart to obtain path diversity and independence in fading. As noted above, to achieve the full benefit from path diversity, each diverse signal is separately demodulated before the resulting demodulated signals are summed together to produce an aggregate result. The demodulation process is performed in headend 40. Thus, in the present invention two separate receive signals are transported from each RAD back to headend 40, one corresponding to each of antennas 100 and 126 referred to respectively as the alpha and beta signal paths. The upstream signaling in the cable plant thus requires approximately twice the bandwidth that is required by the downstream signaling.

From antenna 100, the alpha receive signal enters controllable attenuator 102 and from antenna 126 the beta receive signal enters controllable attenuator 128. Although the placement of controllable attenuators 102 and 128 directly after antennas 100 and 126 seems counter-intuitive, controllable attenuators 102 and 128 serve two important functions. In order for the signal demodulated at headend 40 to be properly combined, the relative signal levels of each signal to be combined must be known so that the signal can be properly weighted for combination with the others. Because only one upstream gain reference signal is generated to facilitate this process from each RAD, the upstream gain reference signal is used to indicate the relative level of both of the two received signals from a single RAD. Thus, the two paths must be balanced in that they both provide the same receive performance (noise figure and gain) to the signals they receive. Controllable attenuators 102 and 128 may be used to calibrate the alpha and beta paths.

The second purpose of controllable attenuators 102 and 128 is to implement RAD breathing and blossoming. Breathing is a process by which the forward and reverse link handoff boundaries are balanced with respect to neighboring RADs. Blossoming is the process by which RADs are added or removed from operation. RAD microprocessor 88 controls the attenuation of controllable attenuators 102 and 128 to effect these processes. Both breathing and blossoming including a variety of implementation variations are explained in detail in above-mentioned U.S. Pat. Nos. 5,548,812, and 5,475,870.

Next within each path, the receive signal is amplified by low noise amplifier 104 and 130. The amplified signal is then converted to a fixed IF frequency by mixer 106 and 132. The fixed IF remains at the same frequency regardless of the frequency being received by antennas 100 and 126 and the frequency used to transmit the signal from the RAD to headend 40 over the cable plant. Mixers 106 and 132 are driven by PLL 118 which produces a frequency as programmed by RAD microprocessor 88 and with reference to RAD reference signal (connections not shown for clarity.)

The output of mixers 106 and 132 is bandpass filtered by filters 108 and 134 respectively to reject unwanted frequencies. Time delay units 110 and 136 may be fixed, field replaceable or controllable delay provisions. A need may arise to provide delay in the receive chain if, for instance, the two signal paths from each antennas 100 and 126 are combined or if the signals are combined with signals from other RADs in the cable plant. For more information see the above-mention U.S. Pat. No. 5,280,472 and U.S. patent application Ser. No. 5,513,176.

Mixer 112 converts the alpha signal to the proper frequency for transmission over the cable plant using a mixing signal provided by PLL 120. Mixer 138 converts the beta signal to the proper frequency for transmission over the cable plant using a mixing signal provided by PLL 122. PLLs 120 and 122 are programmed by RAD microprocessor 88 and referenced to RAD reference signal (connections not shown for clarity.) Summer 144 sums together on a common output the alpha and beta signals and the upstream gain reference signal. Gain control 146 adjusts the gain of the combined signal and amplifier 148 amplifies the combined signal. Coupler 150 couples the combined signal onto the cable plant.

In FIG. 4 RAD microprocessor 88 is shown again for clarity. In the preferred embodiment, RAD microprocessor 88 is a single processing unit that provides control over both the receive and transmit portions of the RAD. Also shown in FIG. 4 is voltage controlled temperature compensated crystal oscillator (VCTCXO) 154. VCTCXO 154 provides a clock signal for RAD microprocessor 88 and a reference signal for upstream gain reference signal generation 152. RAD microprocessor 88 can synchronize and/or phase lock the output of VCTCXO 154 with RAD reference signal after the RAD reference signal becomes available. When the RAD first receives power, the output of VCTCXO 154 can provide a clock and references by which bootstrapping functions can be achieved.

Upstream gain reference signal generation 152 provides a power control mechanism for the RAD. Each RAD transmits a distinguishable upstream gain reference signal back to headend 40 where the signal is measured and compared to the other upstream gain reference signal levels received. Headend 40 can send a message via the RAD reference signal to the individual RAD directing it to increase or decrease power level of the signal it provides to the cable plant. As noted above, the cable plant provides a gain that can change significantly over time. The gain of the cable plant and variation over time is different for different frequencies. Each RAD needs to have an upstream gain reference signal which is distinguishable at headend 40 even if the signals it generates are combined with the signals from other RADs. More details about the operation of the upstream gain reference signal are given below.

Figure 5:
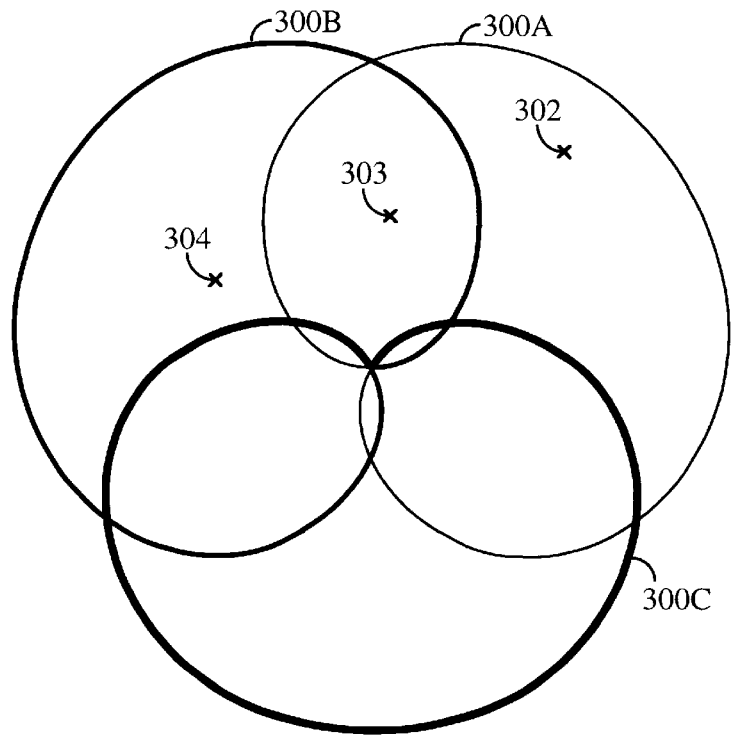
FIG. 5 shows an antenna pattern of a typical three sectored base station.

As noted above, a typical cellular system is comprised of a plurality of spaced apart base stations each having a set of associated collocated antennas. A typical cellular base station may be comprised of three or more sectors. The sectors are subdivisions of the base station that are intimately related. Each sector transmits a different set of signals than the set of signals transmitted by every other sector in the base station. Because the sector circuitry is collocated, it may be easily shared and interconnected between the sectors. The antenna pattern of a typical three sectored base station is shown in FIG. 5. In FIG. 5 coverage area 300A is represented by the finest width line. Coverage area 300B is represented by the medium width line. Coverage area 300C is represented by the heaviest line. The shape of the three coverage areas shown in FIG. 5 is the shape produced by standard directional dipole antennas. The edges of the coverage areas can be thought of as the location at which a remote unit receives the minimum signal level necessary to support communication through that sector. As a remote unit moves into the sector, the signal strength received from the base station as perceived by the remote unit increases. A remote unit at point 302 may communicate through sector 300A. A remote unit at point 303 may communicate through sector 300A and sector 300B. A remote unit at point 304 communicates through sector 300B. As a remote unit moves past the edge of the sector, communication through that sector may degrade. A remote unit operating in soft handoff mode between the base station in FIG. 5 and an unshown neighboring base station is likely to be located near the edge of one of the sectors.

A distributed antenna configuration is described in the above-mentioned U.S. Pat. No. 5,280,472. In the antenna system described in the '472 patent, a series of antennas are strung together separated by delay elements. The series of antennas can be used to provide coverage to an elongated area or an area having a large number of attenuative objects. For example, a distributed antenna can be used to provide a signal down the length of a sidewalk between two very tall buildings. The distributed antenna can easily provide coverage around corners where a standard base station coverage, such as the one shown in FIG. 5, is blocked by large buildings.

Figure 6:
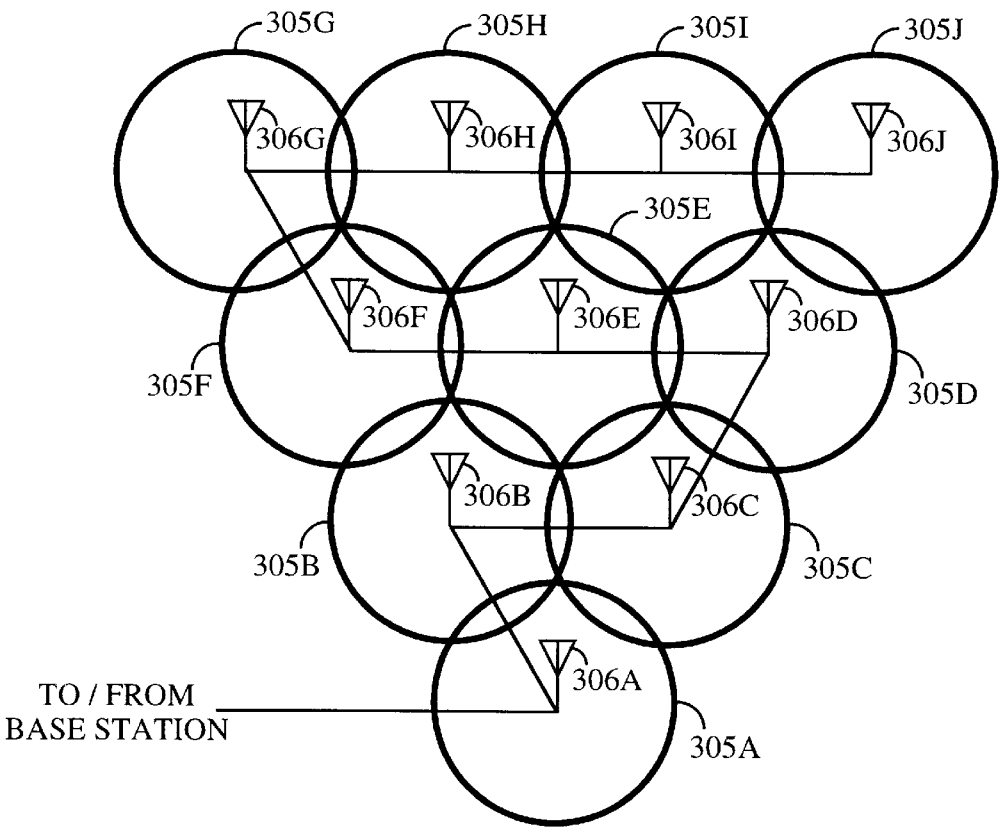
FIG. 6 shows a set of distributed antennas providing coverage to a concentrated coverage area.

A distributed antenna system can be used to provide coverage to a concentrated rather than elongated coverage area. For example, FIG. 6 shows a set of distributed antennas 306A–306J which provide coverage area 305A–305J respectively. A distributed antenna system is typically used in conjunction with a single sector of a base station. Thus, each of distributed antennas 306A–306J transmits the same group of signals. Even when delay elements are used between the antennas, each of distributed antennas 306A–306J provides the same set of signals. In addition to the great flexibility of the coverage area shape, distributed antennas have the advantage of providing relatively constant signal power to the remote units within their coverage areas. Thus, the remote units are able to avoid transmitting at very high transmits levels which rapidly consume battery power.

In the distributed antenna arrangement of FIG. 6, as a remote unit moves between coverage area 305A–305J, neither the base station nor the remote unit performs any sort of handoff. The signals which are communicated through more than one of distributed antennas 306A–306J appear to both the base station and the remote unit as multipath propagations and are discovered, demodulated, and combined in the same manner as naturally occurring multipath propagations.

Figure 7:
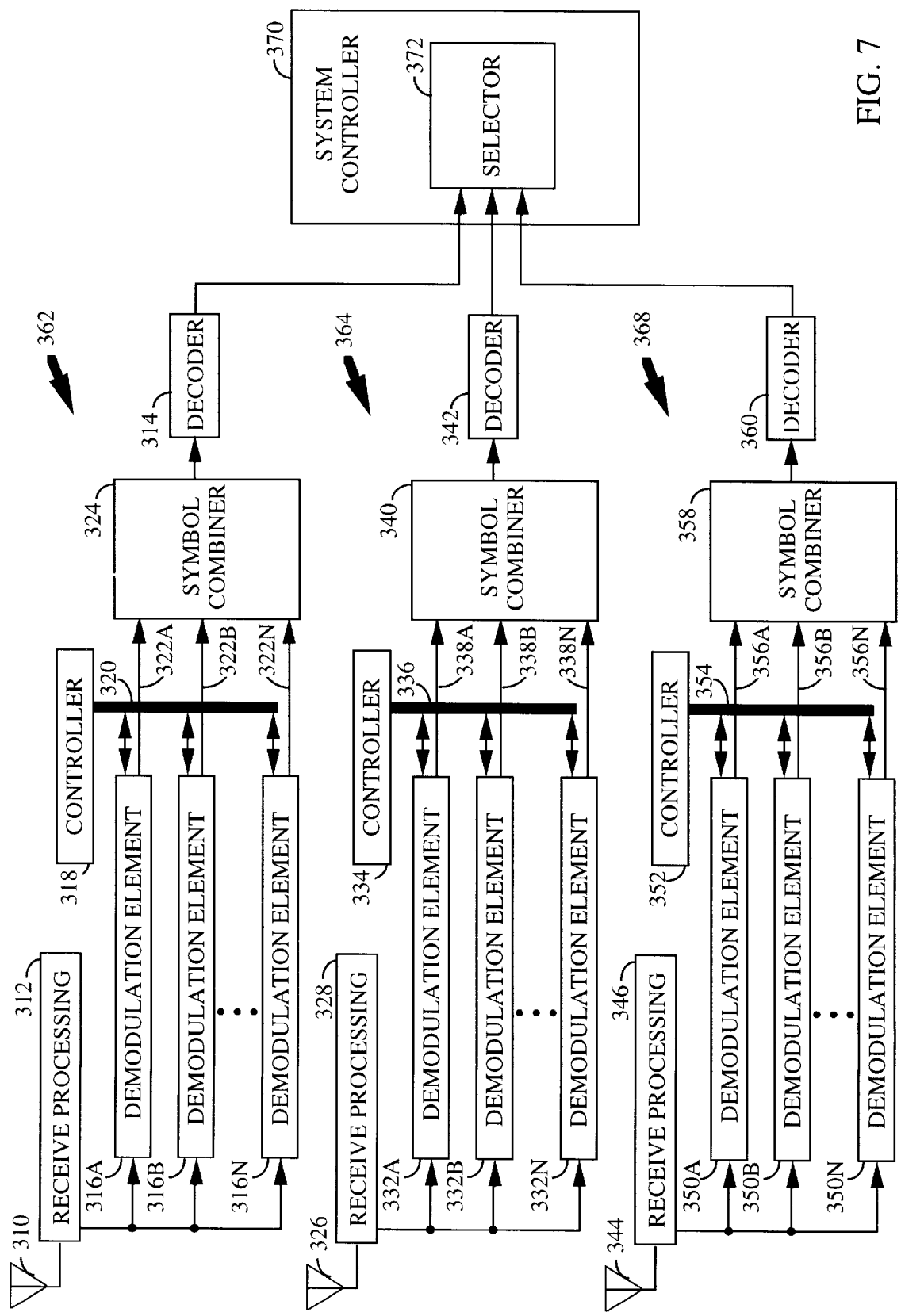
FIG. 7 illustrates an exemplary embodiment of a standard cellular system showing three single sectored base stations.

FIG. 7 illustrates an exemplary embodiment of a standard cellular system showing three single sectored base stations 362, 364, and 368. In FIG. 7, each of antennas 310, 326, and 344 is the receive antenna for base station 362, 364, or 368 respectively. Base stations 362, 364, and 368 are in close proximity to one another and antennas 310, 326, and 344 have overlapping coverage areas such that a single remote unit signal may be in soft handoff with all three base stations at one time. Any one of antennas 310, 326, and 344 may be a distributed antenna such as shown in FIG. 6. Typically base stations used diversity receive antennas meaning that two separate antennas are used at each sector. Each diversity antenna is connected to its own RF receive processing the demodulation elements can be assigned to service signals from either antenna. Such a diversity arrangement is not shown in FIG. 7 for clarity.

Antennas 310, 326, and 344 supply a receive signal to receive processings 312, 328, and 346 respectively. Receive processings 312, 328, and 346 process the RF signal and convert the signal to digital bits. Receive processings 312, 328, and 346 may also filter the digital bits. Receive processing 312 provides the filtered digital bits to demodulation elements 316A–316N. Receive processing 328 provides the filtered digital bits to demodulation elements 332A–332N. Likewise, receive processing 346 provides the filtered digital bits to demodulation elements 350A–350N.

Demodulation elements 316A–316N are controlled by controller 318 through interconnection 320. Controller 318 assigns demodulation elements 316A–316N to one of the instances of information signal from the same remote unit as perceived by base station 362. The distinct instances of the signal may be created due to the multipath characteristics of the environment. Demodulation elements 316A–316N produce data bits 322A–322N that are combined in symbol combiner 324. The output of symbol combiner 324 may be aggregate soft decision data suitable for Viterbi decoding. The combined data is decoded by decoder 314 and output as Message 1 and passed to cellular or personal communications system controller 370.

A power adjustment command from base station 362 for the remote unit is created by controller 318 from the combined signal strength of all the signals demodulated by demodulation elements 316A–316N. Controller 318 can pass the power control information to the transmit circuitry (not shown) of base station 362 to be relayed to the remote unit.

Demodulation elements 332A–332N are controlled by controller 334 through interconnection 336. Controller 334 assigns demodulation elements 332A–332N to one of the instances of information signals from the same remote unit. Demodulation elements 332A–332N produce data bits 338A–338N that are combined in symbol combiner 340. The output of symbol combiner 340 may be aggregate soft decision data suitable for Viterbi decoding. The combined data is decoded by decoder 342 and output as Message 2 and passed to cellular or personal communications system controller 370.

A power adjustment command for the remote unit is created by controller 334 from the combined signal strength of all the signals demodulated by demodulation elements 332A–332N. Controller 334 can pass the power control information to the transmit circuitry (not shown) of base station 364 to be relayed to the remote unit.

Demodulation elements 350A–350N are controlled by controller 352 through interconnection 354. Controller 352 assigns demodulation elements 350A–350N to one of the instances of information signals from the same remote unit as perceived by base station 368. Demodulation elements 350A–350N produce data bits 356A–356N that are combined in symbol combiner 358. The output of symbol combiner may be aggregate soft decision data suitable for Viterbi decoding. The combined data is decoded by decoder 360 and the output as Message 3 and passed to cellular or personal communications system controller 370.

A power adjustment command for the remote unit is created by controller 352 from the estimated signal strengths of all the signals demodulated by demodulation elements 350A–350N. Controller 352 can pass the power control information to the transmit circuitry (not shown) of base station 368 to be relayed to the remote unit.

For each remote unit operating in soft handoff in the system, cellular or personal communication system controller 370 receives decoded data from at least two base stations. For example, in FIG. 7 cellular or personal communications system controller 370 receives decoded data in the form of Messages 1, 2, and 3 from the common remote unit from base stations 362, 364, and 368 respectively. The decoded data cannot be combined to yield the great advantage that is achieved by combining the data prior to decoding. Therefore typically, cellular or personal communication system controller 370 does not combine the decoded data from each base station and instead selects one of the three decoded data Messages 1, 2, or 3 having the highest signal quality index and discards the other two. In FIG. 7 selector 372 performs the selection process on a frame by frame basis and provides the result to a vocoder or other data processing unit. More information about the selection process can be found in copending U.S. patent application Ser. No. 08/519,670 entitled "COMMUNICATION SYSTEM USING REPEATED DATA SELECTION" assigned to the assignee of the present invention.

The reason why the combined but undecoded data output from symbol combiners 324, 340, and 358 is not sent respectively from base stations 362, 364, and 368 to system controller 370 is that the demodulation process produces data at a very high rate. A large block of data is used in the decoding process to produce the decoded symbol. The ratio of the amount of data necessary to decode a data symbol and the amount of data to specify a decoded symbol and quality index can be as high as 1000 to 1. In addition to the complexity, the inherent delay of transporting such large amounts of data is prohibitive unless a very high speed link is used. Thus, the interconnection system between the hundreds of base stations in the system (most of which are not shown in FIG. 7) and system controller 370 is greatly simplified by sending only the decoded data and quality indications instead of the undecoded data suitable for combination.

Aside from the complexity of transmitting the large amount of data associated with combined but undecoded data, the cost is also prohibitive. Typically, the base stations of a system are remotely located from the system controller. The path from the base stations to the system control typically comprises a leased line such as a T1 interface line. The cost of these lines is largely determined by the amount of data that they carry. Thus, increasing the amount of data that is transmitted from the base stations to the system controller can be cost prohibitive as well as technically difficult.

In a less than optimal system the selection method of soft handoff described with respect to FIG. 7 could be directly applied to a sectorized base station by treating each sector of a common base station as a separate, independent base station. Each sector of the base station could combine and decode multipath signals from a common remote unit. The decoded data could be sent directly to the cellular or personal communication system controller by each sector of the base station or it could be compared and selected at the base station and the result sent to the cellular or personal communication system controller. But a much more advantageous method of handling handoff between sectors of a common base station is to use softer handoff as described in the above-mentioned U.S. patent application Ser. No. 08/144,903. Circuitry for providing softer handoff is described in conjunction with FIG. 8.

Figure 8:
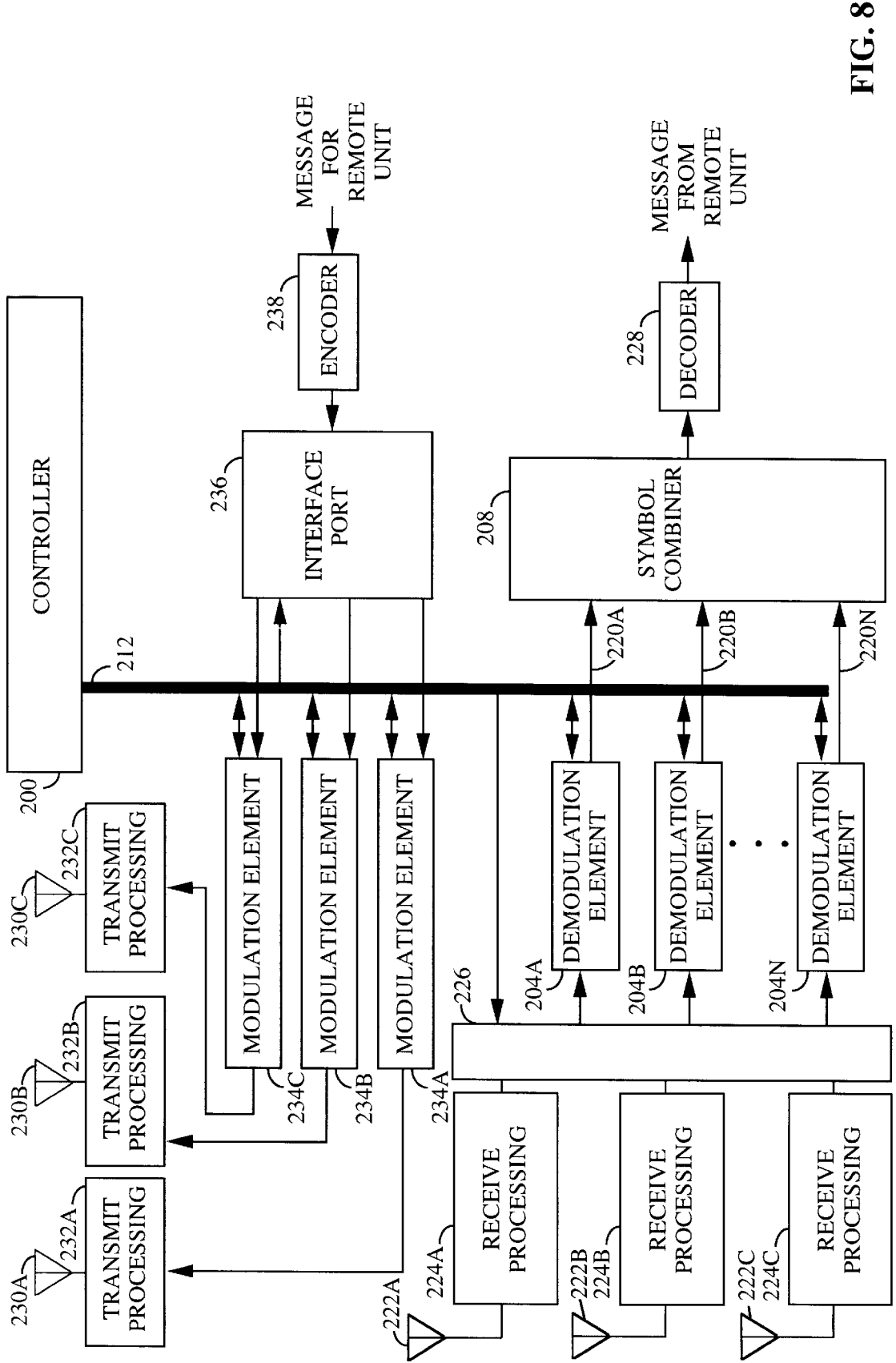
FIG. 8 illustrates an exemplary embodiment of a three sectored base station of a standard cellular system.

In FIG. 8, each of antennas 222A–222C is the receive antenna for one sector and each of antennas 230A–230C is the transmit antenna for one sector. Antenna 222A and antenna 230A correspond to a common coverage area and can ideally have the same antenna pattern. Likewise antennas 222B and 230B, and antennas 222C and 230C correspond to common coverage areas respectfully. FIG. 8 represents a typical base station in that antennas 222A–222C have overlapping coverage areas such that a single remote unit signal may be present at more than one antenna at a time. Antennas 222A–222C may provide antenna patterns as shown in FIG. 5 or one or more of antennas 222A–222C may be distributed antennas.

Referring again to FIG. 8, antennas 222A, 222B, and 222C supply the received signal to receive processings 224A, 224B, and 224C respectively. Receive processings 224A, 224B, and 224C process the RF signal and convert the signal to digital bits. Receive processings 224A, 224B, and 224C may filter the digital bits and provide the resulting digital bits to interface port 226. Interface port 226 may connect any of the three incoming signal paths to any of the demodulation elements 204A–204N under the control of controller 200 through interconnection 212.

Demodulation elements 204A–204N are controlled by controller 200 through interconnection 212. Controller 200 assigns demodulation elements 204A–204N to one of the instances of information signals from a single remote unit from any one of the sectors. Demodulation elements 204A–204N produce data bits 220A–220N each representing an estimate of the data from the single remote unit. Data bits 220A–220N are combined in symbol combiner 208 to produce a single estimate of the data from the remote unit. The output of symbol combiner 208 may be aggregate soft decision data suitable for Viterbi decoding. The combined symbols are passed to decoder 228.

Demodulation elements 204A–204N also provide several output control signals to controller 200 through interconnection 212. The information passed to controller 200 includes an estimate of the signal strength of the signal assigned to a particular demodulation element. Each one of demodulation elements 204A–204N measures a signal strength estimation of the signal that it is demodulating and provides the estimation to controller 200.

Notice that symbol combiner 208 can combine signals from just one sector to produce an output or it can combine symbols from multiple sectors as selected by the interface port 226. A single power control command is created by controller 200 from the estimated signal strengths from all of the sectors through which the signal is received. Controller 200 can pass the power control information to the transmit circuitry of each sector of the base station. Thus each sector in the base station transmits the same power control information to a single remote unit.

When symbol combiner 208 is combining signals from a remote unit that is communicating through more than one sector, the remote unit is in softer handoff. The base station may send the output of decoder 228 to a cellular or personal communication system controller. At the cellular or personal communication system controller, signals from this base station and from other base stations corresponding to the remote unit may be used to produce a single output using the selection process described above.

The transmit process shown in FIG. 8 receives a message for a remote unit from the end user through the cellular or personal communication system controller. The message can be sent on one or more of antennas 230A–230C. Interface port 236 connects the message for the remote unit to one of more of modulation elements 234A–234C as set by controller 200. Modulation elements 234A–234C modulate the message for the remote unit with the appropriate PN code. The modulated data from modulation elements 234A–234C is passed to transmit processing 232A–232C respectively. Transmits processings 232A–232C convert the message to an RF frequency and transmit the signal at an appropriate signal level through antennas 230A–230C respectively. Notice that interface port 236 and interface port 226 operate independently in that receiving a signal from a particular remote unit through one of antennas 222A–222C does not necessarily mean that the corresponding transmit antenna 230A–230C is transmitting a signal to the particular remote unit. Also note that the power control command sent through each antenna is the same, thus sector diversity from a common base station is not critical for the optimal power control performance. These advantages are further exploited to the advantage of the system in the above-mentioned U.S. patent application Ser. Nos. 08/144,901 and 08/316,155 through a process referred to as transmit gating.

Note the increased flexibility of the base station resources. Comparing FIG. 7 to FIG. 8, the flexibility is apparent. In the three base stations represented in FIG. 7, suppose that base station 362 is heavily loaded with signals such that the number of incoming signals is greater than the number of demodulation elements can handle. The fact that base station 364 is lightly loaded and has unused demodulation elements does not aid base station 362. In FIG. 8, however, each demodulation element may be assigned to any one of a plurality of sectors thus allowing allocation of resources to the most heavily loaded sector.

In the present invention there is only one centralized base station at headend 40. (See FIG. 2.) Thus, all the demodulation elements in the system may be considered to be intimately related in the same manner as the sectors of a standard system. Signals from any RAD may be combined before decoding with a signal from any other RAD thus providing an improved system performance. In the most ideal configuration the process of selection is eliminated and softer handoff may be provided over the entire coverage area of the system. Note that in the interest of simplified architecture, it may be advantageous to limit the interconnectivity between the demodulation elements and use selection to combine some signals some of the time.

In addition to the great benefits of providing softer handoff throughout the system, the extreme flexibility of such a system makes it simple to begin initial deployment of a system and to reconfigure the system to adapt to changes in the system. The flexibility comes from the fact that in a system as described herein, each RAD can operate either as a node of a distributed antenna or an independent sector and the role of the RAD may be changed simply, quickly, and remotely by headend 40.

Figure 9:
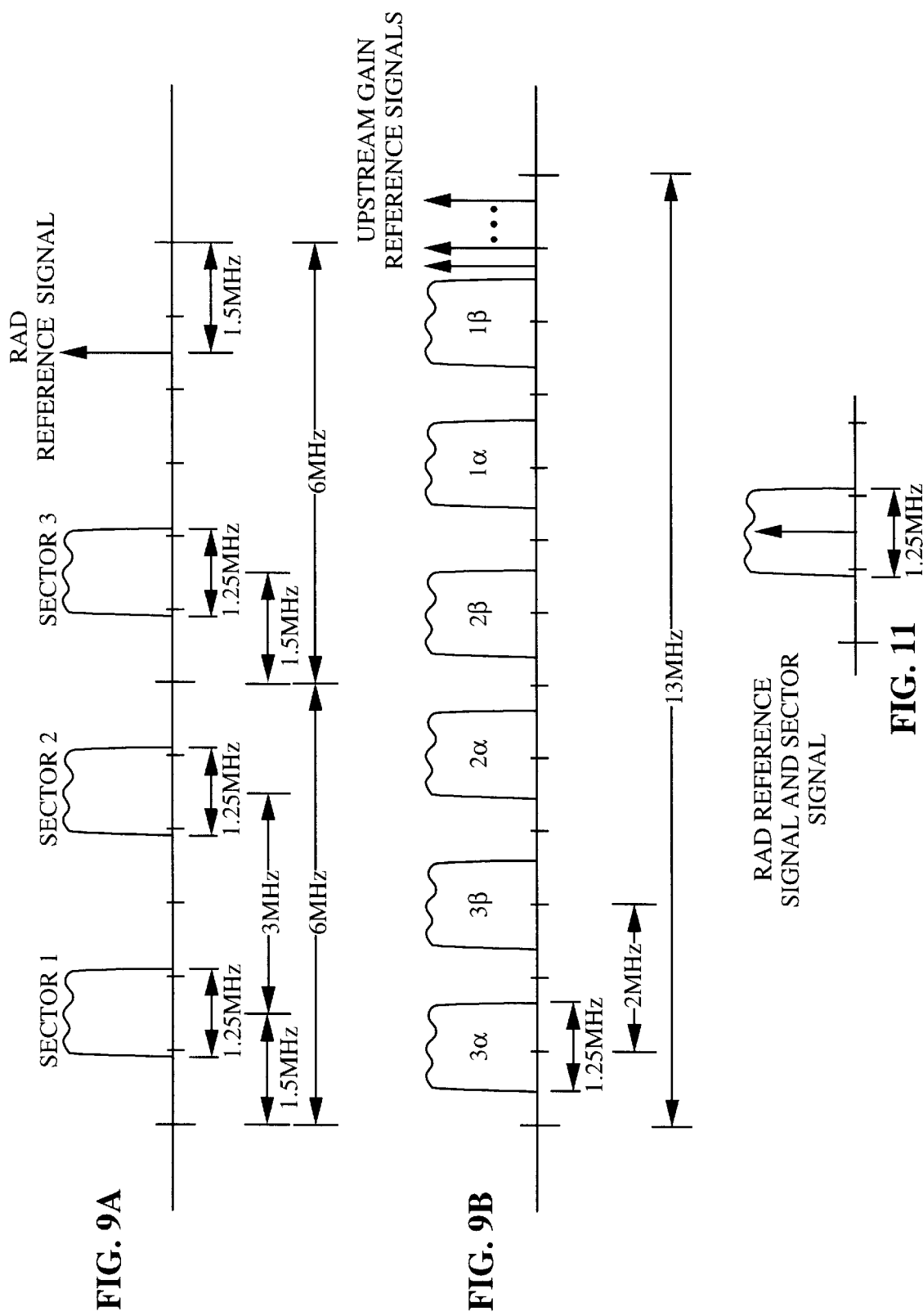
FIG. 9A is an exemplary spectral distribution on the downstream cable plant link.
FIG. 9B is an exemplary spectral distribution on the upstream cable plant link.

FIG. 9A is an exemplary spectral distribution on the downstream cable plant link. Because traditional television channels on the cable plant are allotted 6 MHz of bandwidth, the forward link signaling uses 6 MHz frequency blocks in the preferred embodiment. Also, a typical base station is comprised of three sectors. Thus, to conform with the traditional cellular equipment, the frequency is allotted with reference to three related sectors. Obviously, many other frequency distributions and resource allocations could fit easily within the concepts of the present invention. If FIG. 9A, the CDMA waveform for three sectors is shown. In the preferred embodiment, the CDMA waveform is approximately 1.25 MHz wide for each sector. Also shown in FIG. 9A is the RAD reference signal which is monitored by RAD transmitting any one of the three sectors shown. The sharp SAW filter in the RADs can reject the other CDMA waveforms and the RAD reference signal at the RAD to a sufficient level such that only the desired signal is transmitted over the wireless link to the remote units.

FIG. 9B is an exemplary spectral distribution on the upstream cable plant link. The reverse link signaling is less constrained by traditional upstream spectrum frequency allocation. In the allocation shown in FIG. 9B, it is assumed that at least some of the RADs are equipped with alpha and beta diversity antennas such as the exemplary RAD shown in FIG. 4. Therefore, a larger allocation of upstream bandwidth is needed to service the three sectors. In the exemplary configuration shown in FIG. 9B, 13 MHz is allocated as shown with a portion of the spectrum allocated for the RAD unique upstream gain reference signal.

As apparent from FIGS. 9A and 9B, the sector signals are frequency multiplexed onto the cable. A RAD can be commanded via the RAD reference signal to tune its PLLs such that the sector 1 frequency is transmitted from the RAD and such that the RAD supplies its received signal to the sector one-alpha and sector one-beta frequencies. A second RAD having a contiguous coverage area can be commanded to transmit and receive sector 1 as well. Thus, the second RAD behaves as if it were another antenna with the first RAD in a distributed antenna configuration. This is true whether or not the first and second RADs are connected to the same or different fiber nodes (for example fiber nodes 20A–20I of FIG. 2). In this case a remote unit passing from the coverage area of the first RAD to the coverage area of the second RAD does not perform a handoff at all. Both the remote unit and base station processing perceive the change in coverage areas as simply the creation of a new multipath propagation.

Alternatively the second RAD can be commanded via the RAD reference signal to tune its PLLs such that the sector 2 frequency is transmitted from the RAD and such that the RAD supplies its received signal to the sector two-alpha and sector two-beta frequencies. In this case, as a remote unit moves from the coverage area of the first RAD to the coverage area of the second RAD, the remote unit performs a handoff as described above. Depending on the base station configuration, the base station performs a soft or softer handoff of the remote unit. Typically, the soft and softer handoff are perceived the same from the remote unit perspective.

Figure 10:
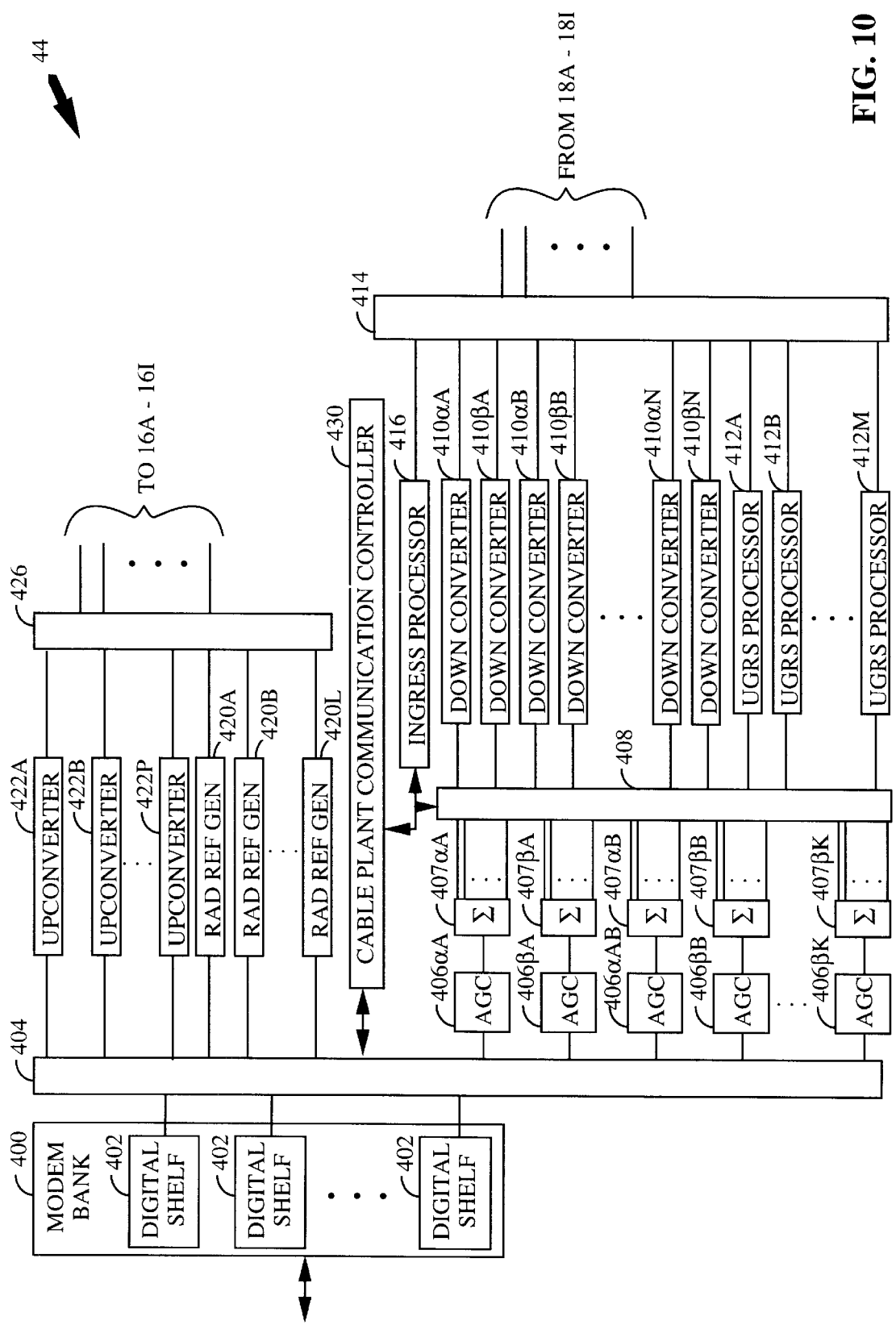
FIG. 10 illustrates an exemplary block diagram of a base station in accordance with the present invention.

FIG. 10 illustrates an exemplary block diagram of a base station in accordance with the present invention. In particular, FIG. 10 shows base station 44 of FIG. 2 in detail. Base station 44 receives input from optical to electrical signal converters 18A–18I. In the most general case, each of optical to electrical signal converters 18A–18I may contain signals for any one of K different sectors supported by base station 44. Dual bank of downconverters 410A–410N is coupled to optical to electrical signal converters 18A–18I via interconnection 414. The dual nature of the downconverters 410A–410N reflects the fact that the fiber strands may contain both an alpha and a beta diversity reception. If there are some RADs that do not provide diversity reception, some of the downconverters need not be dual in nature. In the most general case, interconnection 414 is capable of connecting any one of optical to electrical signal converters 18A–18I to any one of dual bank of downconverters 410A–410N and may be capable of combining signals from two or more of optical to electrical signal converters 18A–18I.

With reference to FIG. 9B, it is easy to see that to downconvert each signal from each incoming sector to a common IF frequency there is not a one to one correspondence between downconverters and optical to electrical signal converters. For example if optical to electrical signal converter 18A provides only the signals corresponding to the three sectors shown in FIG. 9B, there must be six different downconverters—one corresponding to each of sectors 1-alpha, 1-beta, 2-alpha, 2-beta, 3-alpha, and 3-beta—receiving a signal from optical to electrical signal converter 18A. In the preferred embodiment, if optical to electrical signal converter 18A and optical to electrical signal converter 18B each carries signals corresponding to sector 1-alpha at the same frequency, those signals could be combined in interconnection 414 before downconversion.

In the most general case, the fact that a given sector of the K different sectors supported by base station 44 is carried at a first frequency on a first one of the fibers within the cable plant does not necessarily mean that other fibers carry the same sector at the first frequency. Thus even in a system with as few as three sectors and with the ability to combine signals at RF within interconnection 414, more than a two-to-one ratio between the number of supported sectors (K) to the number of downconverters in the dual bank (N) are required. For example, if optical to electrical signal converter 18A carries the set of three sectors shown in FIG. 9B centered about 12 MHz and optical to electrical signal converter 18B carries the set of three sectors shown in FIG. 9B centered about 25 MHz, then 12 different downconverters are necessary to service the three sectors.

Dual bank of downconverters 410A–410N provide down conversation and filtering of the incoming signals. In the preferred embodiment, the signal output from each of dual bank of downconverters 410A–410N is a common IF frequency.

In parallel with dual bank of downconverters 410A–410N are upstream gain reference signal processors 412A–412M.

Interconnection 414 also provides interconnection between the upstream gain reference signal (as exemplary shown in FIG. 9B) from optical to electrical signal converters 18A–18I to upstream gain reference signal processors 412A–412M. The upstream gain reference signal from each RAD must still be separately analyzed at base station 44 and thus the number of upstream gain reference signal processors (M) is not set by the number of dual downconverters (N). In the preferred embodiment, the upstream gain reference signal need only be monitored at intervals rather than continually. For example each upstream gain reference signal processors 412A–412M could be assigned to monitor up to 12 different upstream gain reference signals at one time by sequentially measuring the power level in each. In such a case, the actual number of upstream gain reference signal processors (M) can be lowered.

Upstream gain reference signal processors 412A–412M measure the amplitude of the upstream gain reference signal of each RAD. The measurement of the upstream gain reference signal provides an estimate of the relative amplitudes of the upstream signals. The result of the measurements is reported to cable plant communication controller 430 over interconnection 408. A message is sent back via the RAD reference signal to the corresponding RAD commanding the RAD to increase or decrease the level of the upstream signals it provides. Thus, the relative signal levels output from each RAD is controlled such that the signals may be properly combined within the cable plant or within base station 44. Upstream gain reference signal processors 412A–412M may also provide other functions such as monitoring for messages from the RADs or fault management.

Interconnection 408 performs interconnection between dual bank of downconverters 410A–410N to dual bank of summers 407A–407K. Dual bank of summers 407A–407K sum together the output from each of downconverters 410A–410N which correspond to the same sector.

In addition to the fact that the upstream power from each RAD needs to be controlled relative to the others so that effective combining can be accomplished, headend 40 must also regulate the absolute level of the upstream signal. As noted above, one of the unique problems of using the cable plant to provide distribution of personal communication signals is the presence of ingress signals. The CDMA system of the preferred embodiment is inherently tolerant of the adverse effects of even relatively large jammers injected in the wireless environment and ingress signals injected in the cable plant due to both the broadband nature of the information signal and the reverse link power control mechanisms employed in the system. The reverse link power control mechanism controls the reverse link signal to a very limited dynamic range as received by the RADs. Each remote communication unit adjusts its transmit power so that the RAD receives the remote unit signal at the same level regardless of the distance between the remote unit and the RAD. Because the reverse link power has a relatively low dynamic range, the upstream cable plant signal can have a consistently high power level operating point within the cable plant thus providing consistent advantages over lower power level ingress signals.

However, it is also important that the operating point of the uplink remain low enough so as to not overload the electrical to optical converters and other devices in the path. The operating point of the reverse link upstream signals must also be low enough so as to not cause degradation to the other upstream cable plant signals such as "pay-per-view" indication signaling coming from the cable T.V. subscribers. Thus, headend 40 must also address the absolute level of the upstream signals on the cable plant.

Using the architecture shown in FIG. 10, numerous methods exists by which the absolute level can be controlled. Remember that the upstream gain reference signal reaches headend 40 at the same level regardless of the actual signal level received from the corresponding RAD. Therefore, another method must be used by which to determine the total power. One method is have each active one of dual bank of down converters 410A–410N report to cable plant communication controller 430 the absolute level of the signals it is receiving. In response thereto, cable plant communication controller 430 can command each RAD to increase or decrease the signal level at which it is supplying the upstream signal.

The output of each of dual bank of summers 407A–407K is provided to a corresponding one of dual bank of automatic gain control (AGC) units 406A–406K. Each of dual bank of automatic gain control 406A–406K provide IF signal processing such as filtering. In the preferred embodiment dual bank of down converters 410A–410N output analog signals which are combined by analog dual bank of summers 407A–407K. The combined analog signal is converted to a digital signal within dual bank of automatic gain control units 406A–406K. In order for the analog to digital converters to work properly, the amplitude of the analog signal input into the analog to digital converters must be carefully controlled. The automatic gain control function of the dual bank of automatic gain control units 406A–406K is the process of setting the combined analog signal to the proper level for conversion and does not effect the cable plant power control loops. Alternatively, the A/D converters can be located within modem 400.

Modem bank 400 is connected to dual bank of automatic gain control units 406A–406K through interconnection 404. Modem bank 400 houses a plurality of digital shelves 402. Each digital shelf is comprised of a bank of channel element modems. The channel element modems perform the functions the demodulation elements (such as demodulation elements 204A–204N of FIG. 8). In the most general case, each demodulation element in modem bank 400 may be assigned to any one of the sector signals coming from any one of dual bank of automatic gain control units 406A–406K.

Figure 12:
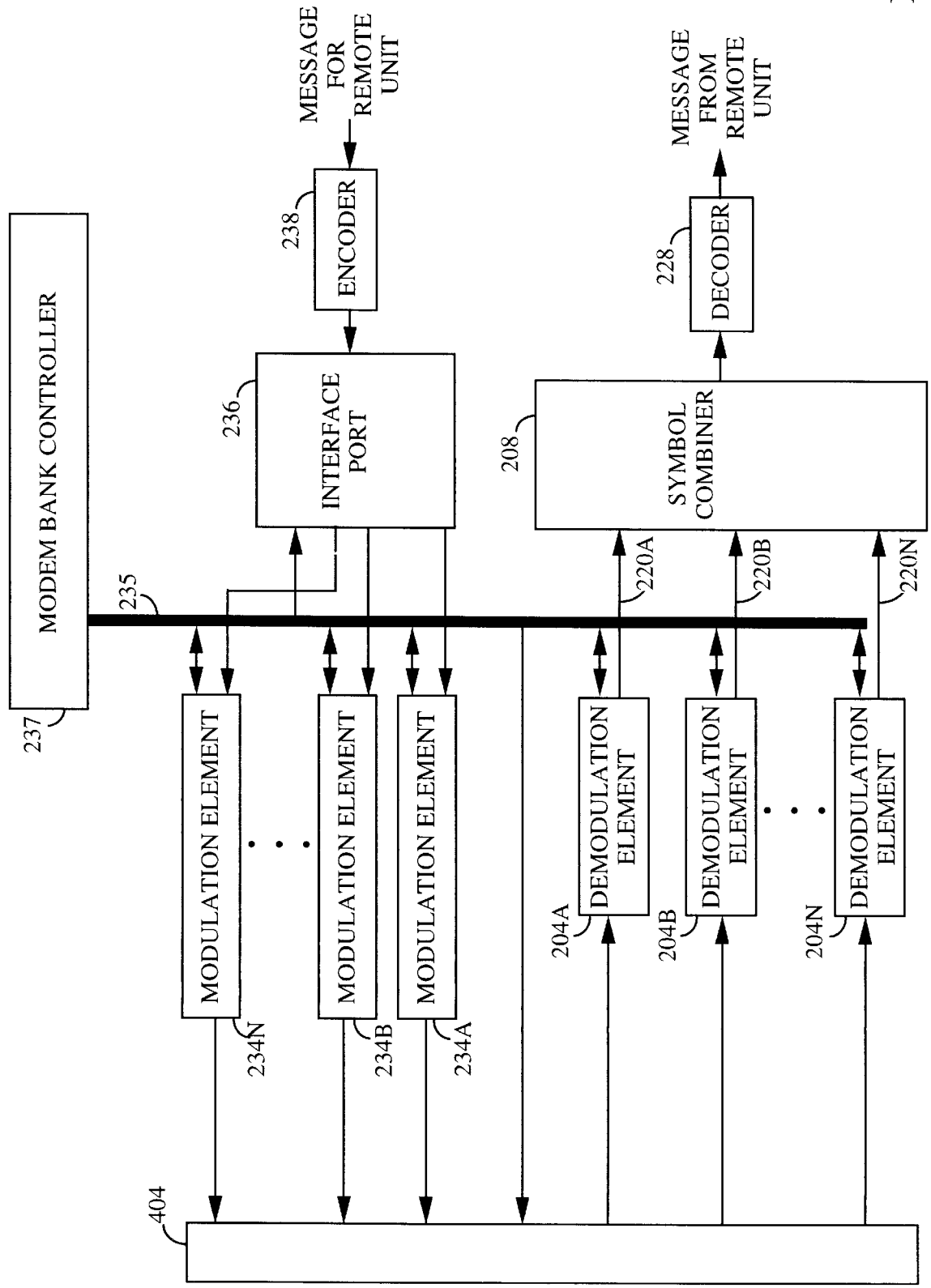
FIG. 12 is a block diagram illustrating partially the functions of the digital shelves.

FIG. 12 shows a partial block diagram of one of the channel element modem in digital shelves 402 using the same numerology for like elements as the elements of FIG. 8. The channel element modem shown in FIG. 12 is used to process signals corresponding to one remote unit. In the most ideal preferred embodiment, each one of demodulation elements 204A–204N may be assigned to demodulate one multipath signal from any one of dual bank of automatic gain control units 406A–406K through interconnection 404. Thus, more than one of demodulation elements 204A–204N may be assigned to the same one of dual bank of automatic gain control units 406A–406K if more than one usable multipath signal is being received from the same one of dual bank of automatic gain control units 406A–406K. Also one of demodulation elements 204A–204N may be assigned to a different one of dual bank of automatic gain control 406A–406K if the remote unit signal is being received on two distinct unmerged paths through the cable plant. Note that the output of each of demodulation elements 204A–204N is combined in symbol combiner 208 weighted according to signal quality independent of which of dual bank of automatic gain control units 406A–406K is supplying the signal and there is no use of the process of selection thus providing soft handoff over the entire coverage area.

FIG. 12 also shows the modulation portion of one of the channel element modems within one of digital shelves 402. In the preferred embodiment, the forward link traffic channel signal is modulated by the pilot sequence before transmission. If the forward link signal created is to be supplied from two RAD units operating in association with different pilot signal offsets, the forward link signal needs to be created by two different modulation elements. Modem bank controller 237 performs analogous control functions through bus 237 to controller 200 of FIG. 8.

Interconnection 414, interconnection 404, interconnection 426, and interconnection 408 ideally can connect any one of the inputs to any one of the outputs thereto. Especially in very large systems, actual practical implementations may limit the interconnectivity for monetary, spatial, or other practical reasons. For example, it may be advantageous to limit the interconnectivity such that a first set of optical to electrical signal converters can be coupled to a first set of downconverters but cannot be coupled to a second set of downconverters. The connection configuration of interconnection 414, interconnection 408, interconnection 426, and interconnection 404 are dynamically controllable by cable plant communication controller 430. (For clarity, some connections are not shown in FIG. 10.)

The transmit signals are created in digital shelves 402. For each active sector, a complete set of signals comprising the pilot channel, sync channel, paging channels, and all traffic (i.e. mobile specific communication) channels are output from digital shelves 402 and input into interconnection 404. Each sector signal output from modem bank 400 is upconverted by at least one of upconverters 422A–422P. If the sector signal is to be transmitted on multiple strands at different frequencies, the sector signal is provided to more than one of upconverters 422A–422P.

For each sector signal, a digital indication of the desired transmit signal level is sent to one or more of RAD reference generators 420A–420L. Every strand carrying a sector signal must also carry a corresponding RAD reference signal which provides the downstream power control information, upstream power control information, and any other control information corresponding to RADs on the strand monitoring one of the sector signals.

If in an alternative embodiment a digital indication of the desired transmit signal level is not generated by digital shelves 402, a power monitoring circuit could be added in front of upconverters 422A–422P which would measure the power in the incoming sector signals. The measured power level would be directly or indirectly reported to the appropriate one of RAD reference generators 420A–420L which would act upon the measured value in the same way as it acts in the preferred embodiment upon the digital indication of the desired transmit signal level.

If a single strand is providing three different sector signals to RADs on the same strand as shown in FIG. 9A, three different digital indications of the desired transmit signal level are sent to a single one of RAD reference generators 420A–420L. For each RAD monitoring the sector signal on this strand, upstream power control information must also be provided. This information is provided from cable plant communication controller 430 as derived from upstream gain reference signal processors 412A–412M.

Interconnection 426 must be capable of coupling output from a plurality of upconverters 422A–422P to one or more of electrical to optical signal converters 16A–16I. If multiple strands are transmitting the same sector information carried in the cable plant at the same frequency, the same upconverter can drive multiple electrical to optical signal converters 16A–16I. If the multiple sectors are transmitted on the same strand as shown in FIG. 9A, more than one of upconverters 422A–422P is coupled to the same one of electrical to optical signal converters 16A–16I. Interconnection 426 also couples the corresponding RAD reference signal from one of RAD reference generators 420A–420L to each of electrical to optical signal converters 16A–16I. If the RAD reference signal has sufficient information bandwidth to provide power control and other control information, the same RAD reference signal may be coupled to a plurality of electrical to optical signal converters 16A–16I. Alternatively a different RAD reference signal may be generated for each strand even if the strands are carrying the same sector signals. In such a case, the RAD reference signal carries only control information corresponding to those RADs on the strand.

Like the upstream link, the absolute level of the downstream link must also be controlled. Typical cable downstream T.V. signals operate at about 112 dB/Hz (decibels/ Hertz.) In the preferred embodiment, the CDMA signal levels could be reduced from that level by approximately 10dB to ensure that the CATV performance is not impacted by the CDMA signaling.

Interconnection 414 also provides connection from optical to electrical signal converters 18A–18I to ingress processor 416. The functions of ingress processor 416 are described in detail below.

In typical macrocellular system, the base stations do not interface directly with the PSTN. Typically, a centralized system controller provides control over a set of base stations. For example, FIG. 7 shows system controller 370 providing the selection process for base stations 362, 364, and 368. In the preferred embodiment the process of selection may be eliminated but there are other functions of the centralized controller which may now be delegated to headend 40. For example, a CDMA system designed in accordance with the "Mobile Station-Base Station Compatibility Standard for Dual-Mode Wideband Spread Spectrum Cellular System," TIA/EIA/IS-95, generally referred to simply as IS-95 provides for voice data which is vocoded into frames. System controller 370 provides the conversion between the pulse code modulation (PCM) signaling used over the PSTN and the vocoded frames used in the CDMA system.

In the preferred embodiment, the system provides for both voice and data service operation from the remote units. The headend may also need to provide various data service functions typically performed by a system controller in a macrocellular system. The headend may also need to perform the billing functions and other call processing functions usually handled by the system controller. The headend may also comprise a switch for switching calls between the CATV system and the PSTN.

A variety of architectures and function allocations are consistent with the present invention. For example, the traditional functions of the system controller may remain delegated to a separate system controller and the headend may be treated as one or several base stations of a larger system.

As noted above the RAD reference signal is used in three ways by the RADs. First, the RAD reference signal is to convey digital information to the RAD. Second, it is used as a frequency reference within the RAD. Third, the RAD reference signal is used as a reference by which the cable plant gain is measured. One method which allows the RAD reference signal to perform all three functions is if the RAD reference signal is an amplitude modulated (AM) signal.

In the preferred embodiment, each RAD in a system is assigned its own unique address. In reality, it is only necessary that each RAD assigned to monitor a common RAD reference signal has a unique address and therefore the addresses could be repeated throughout the system. In the most flexible design, even the RAD addresses are remotely programmable from by headend 40 but the address could also be fixed in hardware. The RAD signaling format can use a standard signaling format in which each RAD monitors the RAD reference signal for its own address. When the address transmitted on the RAD reference signal corresponds to the RAD address or an universal address, the RAD decodes the following message and acts upon it if necessary. If the address does not correspond to the RAD address or an universal address, the RAD simply ignores the following message but continues to monitor the RAD reference signal. The expected signal rate required of the RAD reference signal is only about 300 bits per second (bps) but a standard modem rate of 9.6 kilobps (kbps) or 19.2 kbps could easily be used.

The second use of the RAD reference signal is as a frequency reference for the PLL in the RAD. The RAD reference signal is also used as a frequency reference for the RAD clock to synchronize the transfer of data. As an AM modulated signal, the frequency of the signal remains constant over time and the signal can be used almost directly as a reference. In addition, to avoid amplitude and phase modulation distortion, the modulation used should be fairly fast and have no DC content. A modulation techniques, such as Split-Phase or Manchester modulation, which provide an "M" shaped spectral densities can be used so that the distortion is not located in close to the carrier.

The third use of the RAD reference signal is to approximate the gain of the cable plant between headend 40 and each RAD. The amplitude modulated signal can be used as an amplitude reference if the modulation scheme is carefully designed. For example, the AM modulation index should be kept relatively low. The digital data transmitted should contain an equal number of logical 1's and 0's over relative short intervals. It is also necessary that the RAD average the power of the RAD reference signal over some period of time.

As noted in the background section above, the power of the aggregate forward link CDMA signal carried on the downstream cable plant is a function of the number and relative power of the signals which are combined to create the aggregate forward link signal. Also for the reasons noted above, it is important that the relative power transmitted by each RAD is properly controlled so that the handoff boundaries remain properly aligned between the RADs. A method and apparatus for creating a gain signal indicative of an appropriate aggregate signal strength is detailed in U.S. patent application Ser. No. 08/525,899, filed Sep. 8, 1995, entitled "APPARATUS AND METHOD FOR CONTROLLING TRANSMISSION POWER IN A CELLULAR COMMUNICATIONS SYSTEM" assigned to the assignee of the present invention.

Each sector in the system has an independent aggregate signal strength based on the number and relative signal strength of each signal that it transmits. Each modulation element in digital shelves 402 generating a signal outputs a digital signal which is added to the other indications output from modulation elements producing signal for the same sector. In this way an aggregate transmit level indication, which may be created in accordance with the just mentioned U.S. patent application Ser. No. 08/525,899, indicates the aggregate signal strength of each sector signal modem bank 400 creates.

At the same time, the RAD reference signal is transmitted at a fixed level by headend 40 at all times regardless of the desired output power. The RAD reference signal can be used as a coarse estimate of the cable plant gain. Referring again to FIG. 3, as the RAD is radiating power, the output power is detected by power detector 90 and reported back to RAD microprocessor 88. RAD microprocessor 88 compares the measured transmit power level with the level indicted in digital form as received in the digital information on the RAD reference signal. From the comparison a resultant difference signal is produced representing the amount by which the output power should be lowered or raised. This power control loop is executed with a first time constant consistent with the speed at which the power control commands are received from headend 40 over the RAD reference signal. Note that every RAD radiating the signal corresponding to this sector receives the same power indication in the digital information on the RAD reference signal. As it is the goal of the power control loops to hold the output power within ±1 dB of the desired output level, the first loop may need to operate quite slowly in order to provide the precise output power desired.

At the same time RAD microprocessor 88 is executing the first power control loop, it is also monitoring the absolute level of the RAD reference signal. Note that the gain between each RAD and headend 40 is different and some what independent in that each RAD has a distinct path to headend 40 different than every other RAD. Without the second loop, if conditions changed in the path between headend 40 and the RAD, the output power of the RAD would also change until the first power control loop could bring the level back to the desired level.

However, the RADs use a second power control loop to compensate for changes in the cable plant gain. RAD reference signal processor 84 monitors the absolute level of the RAD reference signal and compares it to a fixed reference. The result of the second comparison is added to the result of the comparison of the first power control loop. The summed signal is output to gain control 72 which sets the output power of the RAD. Thus, when the gain of the cable plant changes, the gain of the RAD changes accordingly.

In other embodiments, only one of the previous methods of power control may be implemented. Such modifications are within the scope of the present invention.

From the previous description of the forward link power control, it is evident that the more closely the RAD reference signal represents the actual gain or change in gain of the cable plant the more precisely the upstream power control works. In the cable plant, the gain variations over time can have a significant frequency dependence. Therefore, the larger the frequency offset between the sector signal and the corresponding RAD reference signal, the lower the correlation of the gain variations of the sector signal to the gain variations of the RAD reference signal. For example, referring again to FIG. 9A, the amplitude of the RAD reference signal shown may provide a good indication of the amplitude of sector 3 while providing a less accurate estimate of the amplitude of sector 1.

Another factor which is evident from an examination of FIG. 9A is that the RAD reference signal itself occupies bandwidth which could be used for other purposes such as another sector signal or a T.V. signal.

One method to more closely couple the amplitude characteristics of the RAD reference signal and the sector signal is to transmit the RAD reference signal at a frequency within the 1.25 MHz CDMA sector signal bandwidth. FIG. 11 shows a scenario in which the RAD reference signal is placed in the center of the CDMA sector signal. The presence of the RAD reference signal within the CDMA waveform does not greatly effect the performance of the system. The PN spreading sequence used in the remote units to demodulate the sector signal inherently provides a significant coding gain to the CDMA signal relative to the RAD reference signal "jammer" energy.

Placing the RAD reference signal in the center of the CDMA sector signal may have additional benefits over placing the RAD reference signal elsewhere in the sector signal. In the remote units, the CDMA waveform is converted to base band such that the center frequency of the RF signal maps to a D.C. value at base band. The D.C. value of the analog CDMA waveform is blocked by analog circuitry before it is digitally converted thus providing an additional rejection mechanism of a signal at that frequency.

A similar technique could be used for the upstream gain reference signal. However, this solution is less elegant on the upstream link because of the number of upstream gain reference signals for each sector may be quite large thus proportionally increasing the amount of interference.

As noted above, the cable plant radio frequency (R.F.) environment is especially hostile. The cable plant is highly susceptible to ingress signals that are likely to develop and change over time. Also, as noted above, the CDMA waveform properties are inherently protected from narrow band interference. Therefore, if a narrow band jammer develops within the spectrum of the upstream sector signals, the system performance may be slightly degraded. However no real mechanism exists within the CDMA circuitry to detect the cause of the degradation.

Ingress processor 416 of FIG. 10 performs this function. Ingress processor 416 surveys the entire usable spectrum in narrow band increments to create a data base of the location of jammers. For example, ingress processor 416 samples a 125 kHz piece of spectrum over a 10 millisecond (msec) interval. If the energy observed in that bandwidth exceeds the energy attributable to the CDMA waveform (which is relatively small due to the broadband nature of the CDMA signal and the narrow band nature of the measurement), ingress processor 416 registers a "jammer" at that frequency. Of the sum of the jammer energy within one of the sector signals exceeds a threshold, the sector signal may be moved to another frequency. The new frequency may be chosen in view of the data base of jammers stored within ingress processor 416 such that the cleanest possible spectrum is used.

The transition to the new frequency may be easily accomplished without interruption of the communication between the RAD and the headend. The set of RADs providing signals at the infected bandwidth are notified via the RAD reference signal to provide the signal at a new frequency. For example in FIG. 4, either PLL 112 or PLL 138 or both could be reprogrammed to a new frequency. At headend 40 one of dual bank of down converters 410A–410N is commanded to begin processing the signals arriving at the new frequency. Note that this entire operation can occur automatically without any human intervention.

The system just described has a great number of advantages in the flexibility it provides When the system is first deployed, the number of users is relatively low. At such an initial deployment, headend 40 may comprise a single sector of resources meaning that every RAD in the system provides the same set of signals. Remote units can travel through the entire system without a handoff being performed.

As the number of remote users increases, additional resources to provide an additional sector can be added at the base station. For example, a new sector requires additional digital shelves and may require additional upconverters and downconverters. When the new base station circuitry is in place, a number of the RADs can be programmed by the headend to operate as the new sector signal. As the number of remote units increases further, more resources are added at the base station and more of the RADs are remotely programmed. Note that the addition of the new sectors does not require any changes to the physical RADs. The programming which must take place is accomplished by the base station remotely. Thus, in addition to the low start up cost required to implement a system, the system can be expanded slowly, easily, and inexpensively.

The ease at which the RADs can be re-programmed to operate as a new sector, may also be taken advantage of when the requirements of the system change. For example, assume that a normally urban area is covered by a series of 5 RADs all of which transmit the same set of signals as distributed antennas of a common sector. In the small area covered by the series of 5 RADs the amount of remote units attempting to use the system suddenly triples due to an unexpected event such as an automobile accident which backs up traffic. The base station is cognizant of the fact that the number of attempts to access the system through the corresponding sector has dramatically increased. The base station can reprogram one or more of the 5 RADs to begin to operate as another sector thus increasing the total number of simultaneous telephone calls which can be serviced in the area. In the most extreme case, each of the five RADs can become a sector unto itself. The base station can do so nearly instantly without the aid of human intervention.

This flexibility feature, which is quite unique to the present invention as compared to conventional macrocellular systems, has boundless possibilities. Another example of a use would be for areas of sporadic utilization. For example, a sports stadium may be crowed for several hours several times a week but may be nearly deserted the remaining hours. In conventional fixed systems, if sufficient resources were provided to service all of the remote units during the sporting events, the resources would remain idle during a majority of the time. However in the present invention, the resources can be allocated to the stadium areas when needed and used throughout the rest of the system when they are not being used at the stadium thus decreasing the cost of the system and increasing the effective capacity. The allocation can be preprogrammed at the headend in view of the known and expected events or the same automatic response to the increase in traffic used in the case of the automobile scenario above can be used.

There are various modifications within the scope of the present invention. For example as noted above, IF processor 70 in FIG. 3 may comprise a fixed delay element to provide the delay necessary to create diversity signals which can be separately demodulated at the remote units. In an alternative embodiment, more than one version of a sector signal could be transmitted over the downstream link of the cable plant. The versions could be delayed at the headend processor or elsewhere in the system and the various RADs acting as distributed elements of a common distributed antenna could transmit the different versions having the different delays rather than providing their own delay.

Another way to provide greater signal carrying capacity on the upstream link is to provide a mechanism of frequency conversion in fiber nodes 20A–20I. On the link from the RADs to the fiber nodes, the upstream bandwidth of the system is limited to the 5–40 MHz range and the downstream bandwidth of the system is limited to the 54 MHz to 700 MHz range. The optical network actually capable of carrying signals over a much greater bandwidth such as 200 MHz. Each fiber node could use a common set of frequencies to carry the upstream signal from the RADs to the fiber node. The fiber nodes could frequency multiplex the upstream signal to a set of frequencies above the operating frequency of the downstream link to carry the signal between the optical network to optical to electrical signal converters 18A–18I. Optical to electrical signal converters 18A–18I could either downconvert the signals before providing them to base station 44 or dual bank of down converters 410A–410N could provide the necessary down conversion.

In the first generation implementation of the present invention, it may be most financially advantageous to build the circuitry at headend 40 from the existing circuitry used in macrocellular systems. A typical fixed location macrocellular base station is comprised of three different sectors. Softer handoff/combination is executed to handoff between the three sectors of a common base station and the soft handoff/selection is used to handoff between any one of the sectors and a sector of another base station. To use existing equipment, the architecture of the headend could be implemented in triple sector sets. Handoff between the sectors of a triple sector set would be softer while handoff between sectors of uncoupled sector triples would be soft handoffs. The most advantageous implementation of such a system would program the RADs in physical proximity to one another to correspond to the three sectors of a triple sector set to increase the number of softer handoffs while decreasing the number of soft handoffs system wide. Thus, the flexibility and other advantages of the system are maintained while further decreasing the initial cost of the system implementation.

There are many obvious variations to the present invention as presented including simple architectural changes. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for providing a communication coverage areas throughout a communication system comprising a cable television plant comprising:

a series of radio antenna devices (RADs) spaced along a cable each of said series of RADs having a cable input and a cable output and a wireless input and a wireless output, wherein each of said series of RADs receives input forward link communication signals and a RAD reference signal from said cable through said cable input and each of said RADs provides output forward link communication signals through said wireless output and each of said RADs receives input reverse link communication signals through said wireless input and each of said RADs provides output reverse link communication signal and upstream gain reference signal through said cable output; and a headend processor coupled to said cable having a base station, said base station having a set of demodulation elements programmably coupled to at least one of a plurality of said series of RADs;

wherein if a first two of said series of RADs are transmitting a common forward link communication signal, said first two operate as nodes of a distributed antenna and wherein if said first two are transmitting different forward link communication signals, said first two operated as sectors of said communication system and wherein said RAD reference signal controls whether said first two operate as nodes or as sectors.

* * * * *